United States Patent
Dowling et al.

[11] 4,024,545
[45] May 17, 1977

[54] LASER-EXCITED MARKING SYSTEM

[75] Inventors: Terence S. Dowling, San Ramon; Robert J. Dompe, Cupertino; Harry G. Heard, Woodside, all of Calif.; Keith K. Hazard, Rosslyn, Va.

[73] Assignee: MB Associates, San Ramon, Calif.

[22] Filed: Dec. 3, 1975

[21] Appl. No.: 637,217

Related U.S. Application Data

[63] Continuation of Ser. No. 462,807, April 22, 1974, abandoned.

[52] U.S. Cl. .............................. 346/76 L; 346/109; 350/6; 354/7
[51] Int. Cl.$^2$ .......................................... G01D 9/40
[58] Field of Search ................. 346/76 L, 108, 109; 354/7; 350/6, 7; 178/7.4

[56] References Cited
UNITED STATES PATENTS

| | | | |
|---|---|---|---|
| 3,181,170 | 4/1965 | Akin | 346/108 |
| 3,276,030 | 9/1966 | Stauffer | 346/29 |
| 3,448,458 | 6/1969 | Carlson et al. | 346/108 X |
| 3,506,779 | 4/1970 | Brown et al. | 178/6.6 |
| 3,701,999 | 10/1972 | Congleton et al. | 346/108 X |
| 3,803,637 | 4/1974 | Martin | 346/108 X |
| 3,820,123 | 6/1974 | Ammann | 354/7 |

*Primary Examiner*—Joseph W. Hartary
*Attorney, Agent, or Firm*—Harness, Dickey & Pierce

[57] ABSTRACT

A laser-excited marking system wherein a laser beam is used to mark information on an article. A laser beam from a laser is directed onto a scanner unit which includes positionable mirrors for reflecting the laser beam onto the article. The positionable mirrors are positioned in accordance with control signals from a controller to reflect the laser beam in two dimensions. Information consisting of alphanumeric and symbolic characters is provided as an input to the controller. The controller includes a general purpose computer which is programmed to develop control signals for the scanner unit whereby the character information input to the controller is marked by the reflected laser beam on the article. Stored within the computer is a listing containing a two-dimensional dot matrix representation of each alphanumeric and symbolic character, each such dot matrix being referred to as a character matrix. The computer generates a two-dimensional label matrix corresponding to the information to be marked on the article and composed of individual character matrices. The computer scans the entire two-dimensional label matrix for the occurrence of dots. Whenever a dot is encountered, the controller supplies control signals to the scanner unit to position the positionable mirrors in positions corresponding to the location of the dot in the matrix. The controller then pulses the laser whereby a mark is made on the article at a location corresponding to the location of the dot in the label matrix. The scanning and marking is continued in this manner until the entire label matrix has been scanned.

10 Claims, 20 Drawing Figures

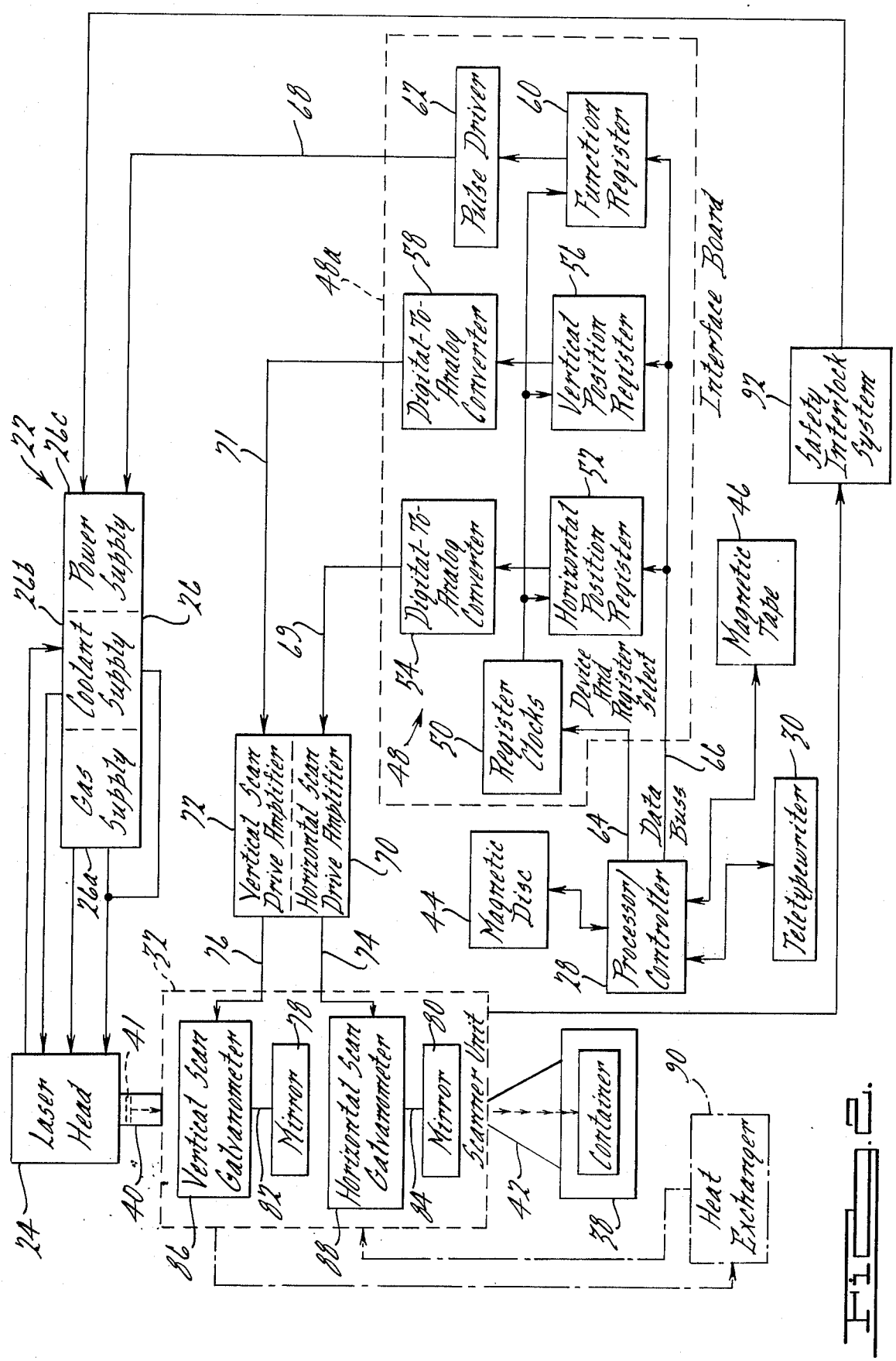

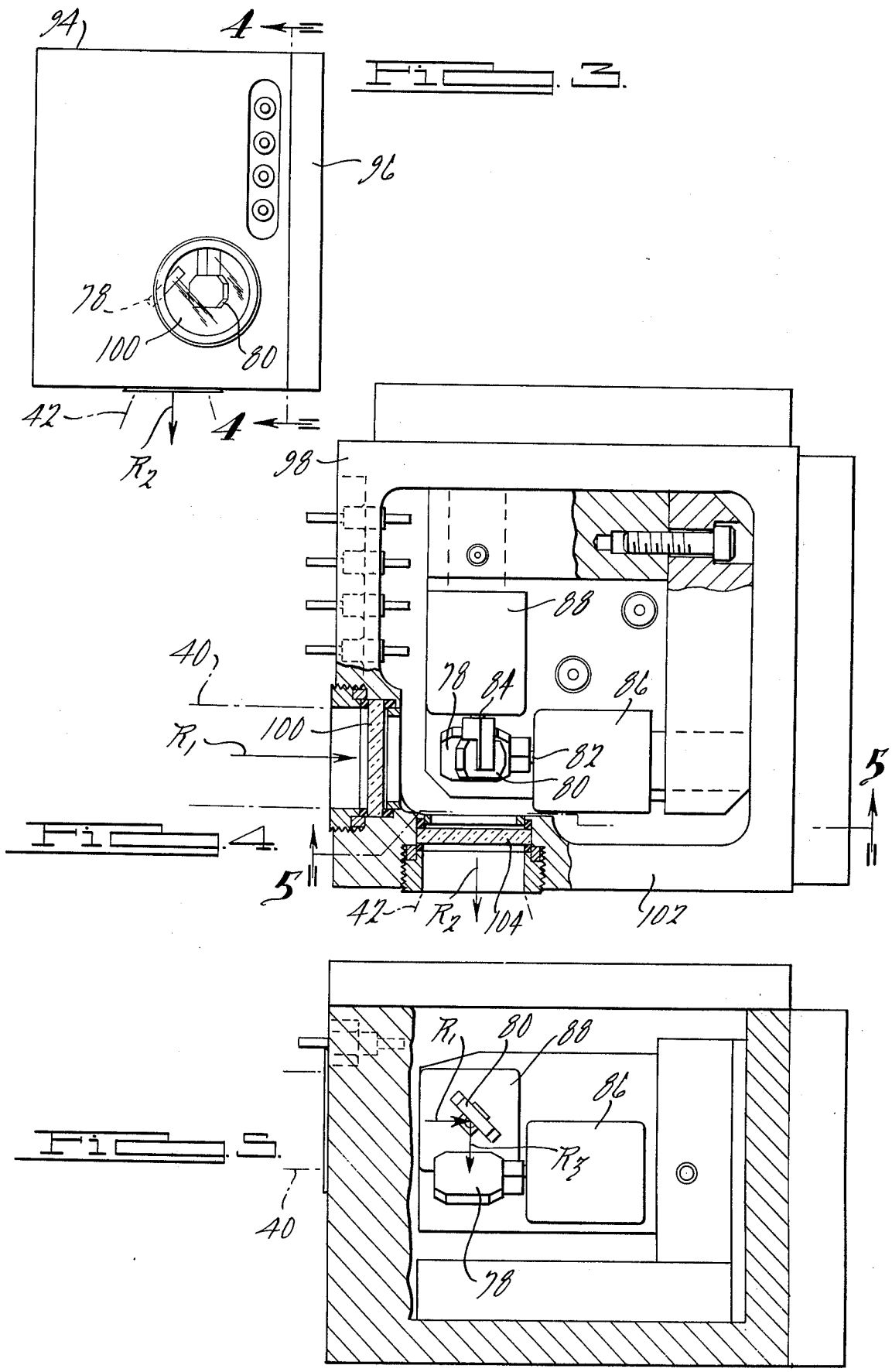

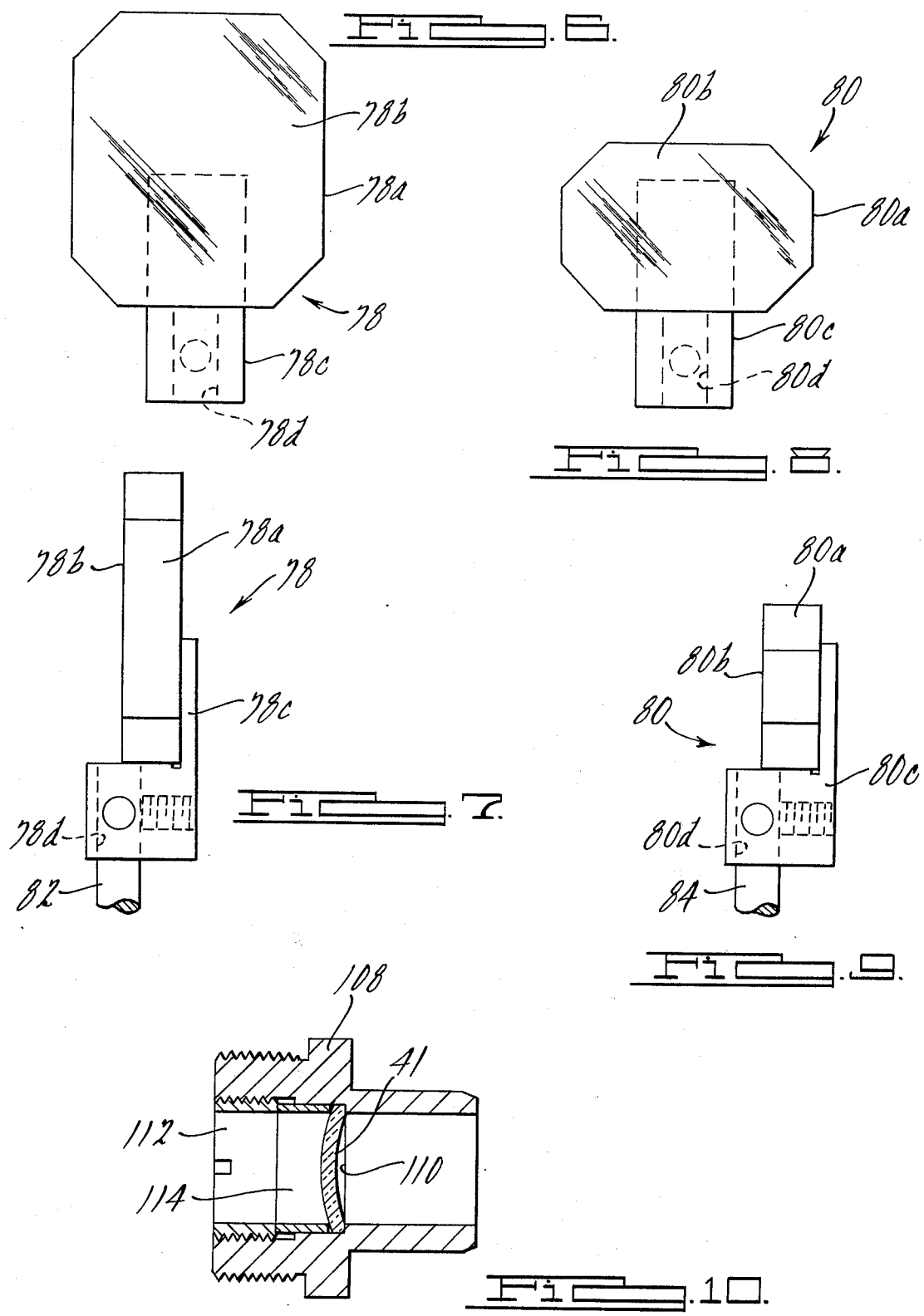

FIG. 14

```
j= 1 2 3 4 5 6 7 8 9 10 11 12 13 14 15 16 17 18 19 20 21 22 23 24 25
k=1   LASER-EXCITED
  2   CONTAINER AUTOMATIC
  3   MARKING SYSTEM (CAMS)
  4
  5   MBASSOCIATES
  6   P.O. BOX 196
  7   SAN RAMON
  8   CALIFORNIA    94583
  9
 10   ATT: ROBERT MAINHARDT
 11        PRESIDENT
 12
```

FIG. 15.

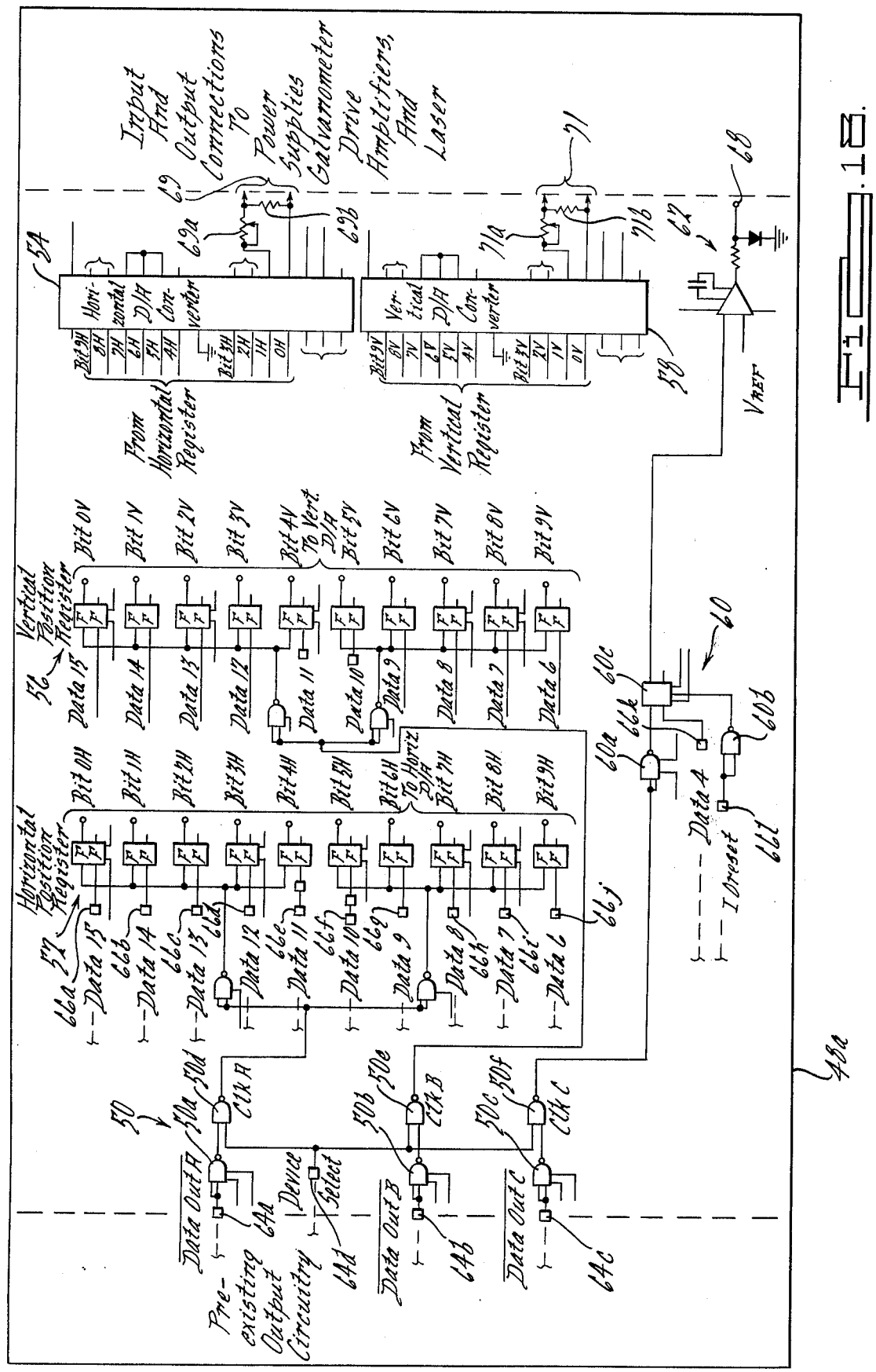

LASER-EXCITED MARKING SYSTEM

This is a continuation, of application Ser. No. 462,807, filed Apr. 22, 1974, now abandoned.

BACKGROUND AND SUMMARY OF THE INVENTION

The present invention pertains to a system for marking information on an article and, in particular, to a novel laser-excited marking system for marking information on an article by means of a laser beam.

The labeling of articles, generally speaking, is a time-consuming, tedius, often-difficult task and in many instances requires an appreciable amount of labor, especially where labels are unique to each particular article. Yet, labeling of articles has been, and undoubtedly will continue to be, an essential part of commerce. Two essential requirements for any label are legibility and permanency, at least until the label serves its intended purpose. Many labeling techniques heretofore known have fallen short of attaining these two essential requirements; those which have been successful often have only limited utility.

The present invention is directed toward a novel marking system for marking information on articles which: possesses a wide range of utility; produces highly legible labels possessing excellent contrast; may be used to mark a variety of different articles; imparts a permanent marking which remains legible even when the label is exposed to rain, sunshine, and other weathering conditions; permits the label size to be easily adjusted to suit differently sized articles; does not require direct human contact to apply the labels to articles; permits individual labels to be readily composed on site to suit specific individual labeling requirements for particular articles; can apply labels at a distance from the articles; produces highly individualistic labels which, in spite of this highly individualistic character, require no chemical processing or drying time; creates labels of essentially negligible weight; is capable of rapidly labeling articles even though the labeling requirements may be different from article to article; is capable of marking articles with machine readable characters; and in many other respects provides significant improvements over current marking and labeling systems.

Additional features and advantages of the invention, along with those enumerated above, will be seen in the ensuing description and claims which are to be taken in conjunction with the accompanying drawings.

BRIEF DESCRIPTION OF THE DRAWINGS

In the drawings:

FIG. 2 is a schematic diagram in block diagram form of the marking system shown in FIG. 1.

FIG. 3 is an enlarged end view of one element, namely, the scanner unit, of the marking system taken in the direction of arrow 3 in FIG. 1.

FIG. 4 is a sectional view taken in the direction of arrows 4—4 in FIG. 3, and slightly enlarged.

FIG. 5 is a sectional view taken in the direction of arrows 5—5 in FIG. 4.

FIG. 6 is a plan view of a mirror and holder assembly used in the scanner unit shown in FIGS. 3, 4, and 5.

FIG. 7 is a right-hand side view of FIG. 6.

FIG. 8 is a plan view of another mirror and holder assembly used in the scanner unit shown in FIGS. 3, 4, and 5.

FIG. 9 is a right-hand side view of FIG. 8.

FIG. 10 is a longitudinal sectional view taken in the direction of arrows 10—10 in FIG. 1 and enlarged.

FIG. 14 illustrates a complete shipping label marked on an article by the marking system.

FIG. 15 is a fragmentary enlarged view of the label of FIG. 14 illustrating details of how the label is marked on the article.

FIG. 16 illustrates dot matrix representations of various alphanumeric and symbolic characters which may be marked on articles.

FIG. 18 is an electrical schematic diagram of a portion of the system.

DESCRIPTION OF THE PREFERRED EMBODIMENT

Figure 1:
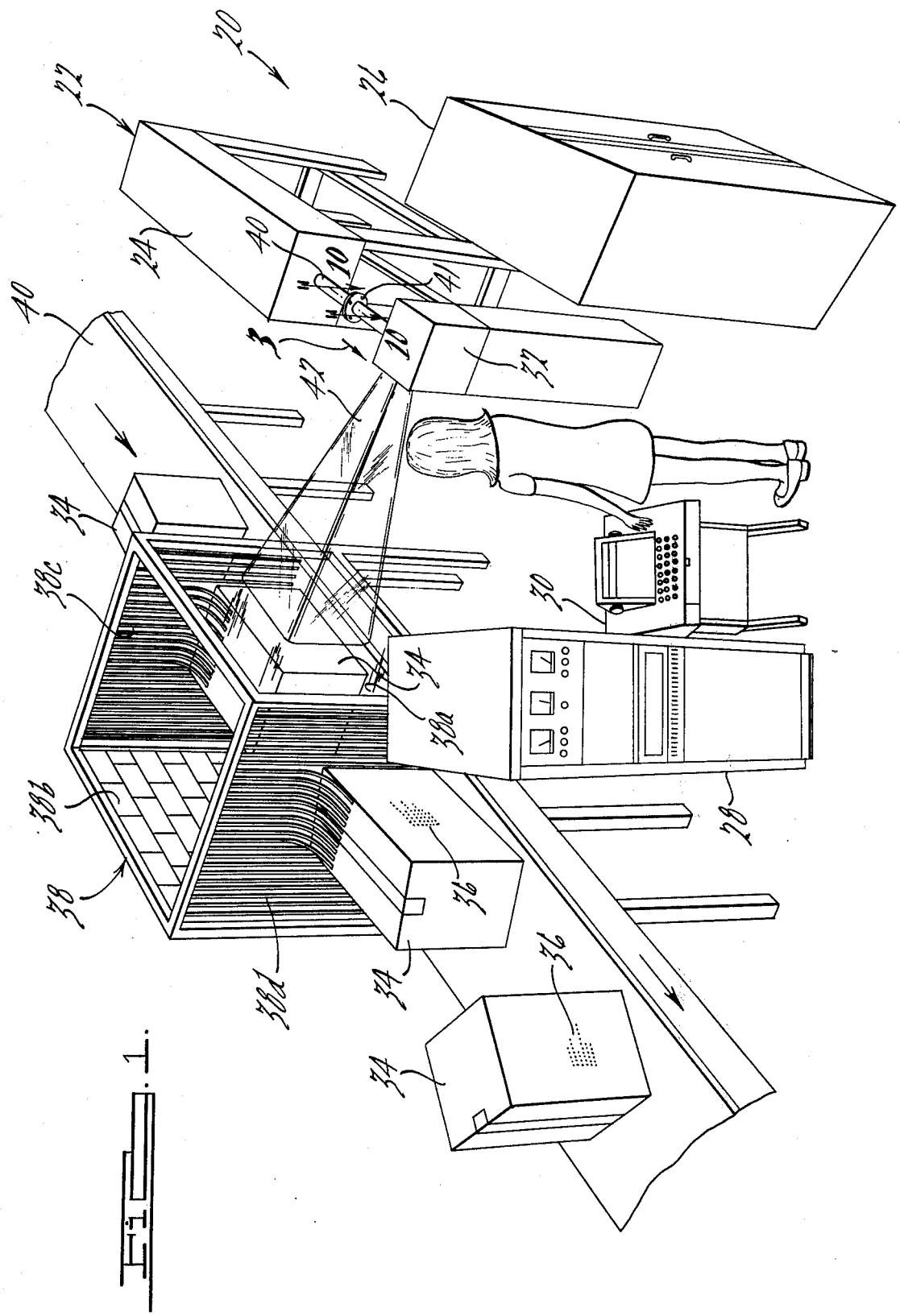
FIG. 1 is a perspective view of a marking system in accorddance with principles of the present invention illustrating the marking of shipping labels on articles.

In FIG. 1, a laser-excited marking system 20 according to the present invention comprises: a conventional laser system 22 including a laser head 24 and ancillary supply equipment 26; a processor/controller 28; a teletypewriter 30; and a scanner unit 32. The marking system 20 is shown marking individual articles, or containers, 34 with appropriate shipping labels 36. The marking takes place within a rectangular enclosure 38 through which articles 34 are successively conveyed by means of a conveyor 40. Enclosure 38 includes a protective front window 38a facing scanner unit 32, a radiation absorbent backstop 38b behind window 38a, a side entrance curtain 38c through which articles enter, and a side exit curtain 38d through which articles exit. A protective aluminum tube 40 containing a focusing lens 41 extends between laser head 24 and scanner unit 32, and a protective shield 42 extends between scanner unit 32 and a central opening in front window 38a. In order to better appreciate the ensuing detailed description of the system, the system operation may be briefly summarized as follows. An article 34 to be marked is conveyed into enclosure 38 and brought into alignment with scanner unit 32. Coherent electromagnetic radiation is emitted as a pulsed beam from laser head 24 to pass through tube 40 and into scanner unit 32, the beam being focused by lens 41. Scanner unit 32 redirects the laser beam through shield 42 and into enclosure 38 where it strikes the article being marked. Scanner unit 32 and laser system 22 are controlled by processor/controller 28 in such a manner that the laser beam marks a complete shipping label on each article 34. The invention permits articles to be rapidly marked with a highly legible, substantially permanent label without any human contact with the articles. Furthermore, as will become apparent later in greater detail, the invention possesses great versatility, being capable to rapidly generate a unique label for each article. Labels marked by the invention require no processing or drying time and can be imparted to a variety of commonly used articles, such as fiber board cartons, wood crates, etc. After an article has been marked, it is conveyed from enclosure 38 while the next article enters the enclosure.

In view of the concentrated energy content of the laser beam, it is desirable to provide suitable shielding for the beam. Accordingly, laser head 24, scanner unit 32, and aluminum tube 40 are constructed to totally enclose the laser beam as it passes from laser head 24 through tube 40 into scanner unit 32. Enclosure 38 and shield 42 are also constructed to shield the beam and to minimize reflected radiation. Radiation absorbent backstop 38b should be capable of absorbing the laser beam energy should the laser beam be emitted when an article is not positioned in enclosure 38 in the path of the beam, and the side curtains and the front of enclosure 38, along with shield 42, should comprise material capable of absorbing reflected radiation. An especially good material for window 38a and shield 42 is transparent acrylic plastic which not only can efficiently absorb reflected radiation at the laser beam wave length but also permits the article to be viewed as it is being marked.

Greater detail of the system is disclosed in FIG. 2 which illustrates the system in block diagram form. The laser system is entirely conventional. The ancillary supply equipment 26 for laser head 24 includes a gas supply 26a, a coolant supply 26b, and an electrical power supply 26c. These supplies are operatively coupled with laser head 24 via a plurality of appropriate conduits and connections. By way of example, a suitable laser is a $CO_2$ continuous gas flow type operating in a laser medium of $CO_2$-$N_2$-He at a wave length of 10.6 microns rated for an average output power level of 500 watts continuous in gear $TEM_{00}$ mode and capable of pulsed mode operation. Such a laser system is commercially available from Coherent Radiation, Palo Alto, Calif., as Model 43. The specifications for the Model 43 laser system in the pulsed mode include a pulse length range of 100 microseconds to 10 seconds, a pulse repetition rate range of 1 Hz--1 KHz with 1,000 watts peak output power for pulse lengths less than or equal to 1 millisecond and 500 watts peak output power for pulse lengths greater than 1 millisecond. The beam diameter is 14 millimeters at $1/e^2$ power points with a beam divergence of 1.4 mr (full angle).

Processor/controller 28 is a conventional, general purpose computer. An example of such a computer is the Data General NOVA 820 Central Processor. Teletypewriter 30 is a conventional Model 33 ASR available from Date General, Southboro, Massachusetts, as Model 4010 A including Model 4010 teletype I/O interface which renders it compatible with proccessor/controller 28 whereby input information can be entered into and output information retrieved from processor/controller 28 via teletypewriter 30. Additional equipment which contribute to the versatility and capability of the system include a magneticc disc unit 44 and a magnetic tape drive unit 46. The magnetic disc unit is available as a Data General Model 6001 with Data General Disc Control Model 4019 to render it compatible with processor/controller 28. Similarly, a magnetic tape drive unit is available as a Data General Model 4030J with a Magneticc Tape Control Model 4030 for compatibility with proccessor/controller 28. An interface system 48 containing various interfacing circuits is provided between processor/controller 28 and both scanner unit 32 and laser system 22. Interface system 48 is contained physically on an interface board 48a mounted within processor/controller 28. Interface board 48a, details of which are shown in FIG. 18 and will be explained later, is a commercially available article provided by processor/controller manufacturers which permits the user of a processor/controller to integrate the processor/controller into the overall system in which the processor/controller is used. By way of example, a suitable interface board is available from both Data General and from Digital Computer Corporation. The Digital Computer Corporation interface board is Model No. D-116. This board contains various electronic circuits and terminal pins which provide output signals from processor/controller 28 which are used in control of the system with which the processor/controller is integrated. A portion of the board contains space for mounting interfacing circuitry and for connecting this interfacing circuitry with the existing terminal pins on the board. The interfacing circuitry basically converts the output signals developed by the proccessor/controller into suitable form for use with the system components which are under the control of the processor/controller. In the present invention, this interfacing circuitry receives control signals from processor/controller 28 and supplies these signals to scanner unit 32 and to laser system 22 in a form which is compatible with the scanner unit and the laser system. Proceeding with the description of interface system 48 as shown in FIG. 2, one can see that the interface system includes: a register clocks circuit 50; a horizontal position register 52; a digital-to-analogue converter 54 operatively connected with horizontal position register 52; a vertical position register 56; a digital-to-analogue converter 58 operatively connected with vertical position register 56; a function register 60, and a pulse driver 62 operatively coupled with function register 60.

Register clocks circuit 50 is operatively coupled with processor/controller 28 via a device and register select channel 64, while registers 52, 56, and 60 are operatiely coupled with processor/controller 28 via a data buss channel 66. The output of pulse driver 62 is operatively coupled via a channel 68 with power supply 26c of laser system 22. The respective digital-to-analogue converters 54 and 58 have their respective outputs connected via respective channels 69 and 71 with respective horizontal and vertical scan drive amplifiers 70 and 72. The drive amplifiers 70 and 72 are in turn respectively connected with scanner unit 32 via channels 74 and 76, respectively. Scanner unit 32 includes a vertical scan mirror 78 and a horizontal scan mirror 80, which are respectively affixed to respective output shafts 82 and 84 of respective vertical and horizontal scan galvanometers 86 and 88. While the mechanical details of scanner unit 32 will be explained later in connection with FIGS. 3-9, it may presently be stated that mirrors 78 and 80 are respectively positioned by galvanometers 86 and 88 in accordance with control signals from proccessor/controller 28. Galvanometers 86 and 88 are commercially available items, each of which is capable of angularly positioning its output shaft in accordance with an electrical input signal supplied from its drive amplifier. Preferably, the galvanometers are characterized by fast and accurate response and a relatively high degree of resolution. By way of example, suitable galvanometers and drive amplifiers are available from General Scanning, Inc., Watertown, Massachusetts, as Series G scanners and associated drive amplifiers.

The system also shows an optional heat exchanger 90 which may be arranged in heat exchange relation with scanner unit 32 to provide cooling for the scanner unit if needed. The heat exchanger 90 is shown in broken lines in FIG. 2 to indicate that the inclusion of the heat exchanger will depend upon the specific construction of scanner unit 32.

A safety interlock system 92 is also provided to prevent generation of the laser beam upon the occurrence of a given condition or conditions in the system which would render the generation of the laser beam undesirable. The safety interlock system is illustratively shown interconnected between scanner unit 32 ad the laser system power supply 26c. Upon the occurrence of a condition in scanner unit 32, safety interlock system 92 operates to disconnect power supply 26c from the rest of the laser system so that laser head 24 is prevented from generating a laser beam even though command signals from other portions of the system (namely, pulse driver 62) may be commanding the generation of the laser beam. In one specific example, the safety interlock system could include a plurality of normally open microswitches on scanner unit 32 which would be responsive to displacement of the scanner unit cover from its closed position. These microswitches are mounted so as to be held closed when the cover is in the closed position. The microswitches are electrically connected in series with each other, thereby constituting a series safety interlock circuit. So long as the scanner unit cover remains closed, the microswitches remain closed thus providing a completed circuit path through the series safety interlock circuit. However, if the cover is displaced from its closed position, indicating an undersirable condition, then one or more of the microswitches is released thereby breaking the series safety interlock circuit. If additional interlocks are desired, these can be connected in series along with the microswitches: for example, a normally open keyactuated switch which must be closed by an appropriate key; a normally closed, palm-button-type emergency stop switch which can be manually actuated to its open position in emergency; a power interlock which will break the series circuit when power is lost. The series safety interlock circuit may be connected between a source of power and a relay coil. In order to energize the relay coil from a power supply, a conventional reset circuit is employed, and only when the series safety interlock circuit is complete does actuation of the reset cause the relay coil to be energized from the power supply. The relay coil is also connected through one of its own normally open contacts (a sealing contact) back to the power supply whereby, when the reset is actuated and the safety interlock circuit complete, the relay coil will be energized from the power supply and will be sealed in this condition by this sealing contact. Another normally open contact of the relay (a laser interlock contact) can be used to provide the interlock with the laser power supply 26c. With this arrangement, the laser interlock contact remains closed so long as the relay coil is energized. In the event that the series safety interlock circuit is broken, then the relay coil is de-energized and its normally open contacts return to their open conditions. The open laser interlock contact prevents the laser from being operated until the fault condition has been corrected and the interlock system reset. Other interlocks are possible, such as interlocks responsive to other conditions in scanner unit 32 or conditions associated with enclosure 38. It should also be mentioned that it may be desirable to provide air circulation through enclosure 38 by means of blowers or fans to scavenge contaminants (e.g., smoke, particles, etc.) generated within the enclosure.

Details of scanner unit 32 are shown in FIGS. 3-9. Scanner unit 32 comprises a rectangular housing 94 having an opening which is normally closed by a removable cover 96. The side wall 98 of housing 94 which faces laser head 24 contains a circular window 100 in alignment with and at the end of tube 40. The side wall 102 of housing 94 which faces enclosure 38 includes a circular window 104 which is in alignment with and at the narrow end of shield 42. Both windows 100 and 104 are securely and sealingly mounted by means of threaded inserts and seals, and the windows are of a material which is transparent to the laser beam; for example, gallium arsenide is an especially suitable material. As best shown in FIGS. 4 and 5, galvanometers 86 and 88 are mounted within housing 94 to support their respective mirrors 78 and 80 in positions such that the incoming laser which enters scanner unit 32 through window 100 in the direction designated $R_1$ is reflected by the mirrors to exit from scanner unit 32 through window 104 in the direction designated $R_2$. Galvanometers 86, 88 are mounted within the interior of housing 94 at a right angle to each other but with their respective axes skewed or offset from each other in the vertical direction horizontal scan galvanometer 88 being disposed vertically above vertical scan galvanometer 86. Mirrors 78 and 80 are affixed to the respective shafts 82 and 84 of the respective galvanometers 86 and 88. The reflecting surface of each mirror is flat, passing through the axis about which the shaft rotates, and being symmetrical about this axis. FIGS. 3, 4, and 5 illustrate the galvanometers and their mirrors in what will hereinafter be referred to as the null position. In the null position, horizontal scan mirror 80 is inclined at a 45° angle relative to the incoming laser beam and therefore reflects the beam vertically downwardly in the direction $R_3$ as shown in FIG. 5. In the null position, vertical mirror 78 is disposed at a 45° angle relative to the direction $R_3$ and, therefore, reflects the beam in the direction $R_2$ which is at a 90° angle relative to the direction $R_3$. Therefore, with both scan galvanometers and their mirrors at the null position, the incoming laser beam is reflected by scanner unit 32 to exit directly along the axis of shield 42.

Figure 11:
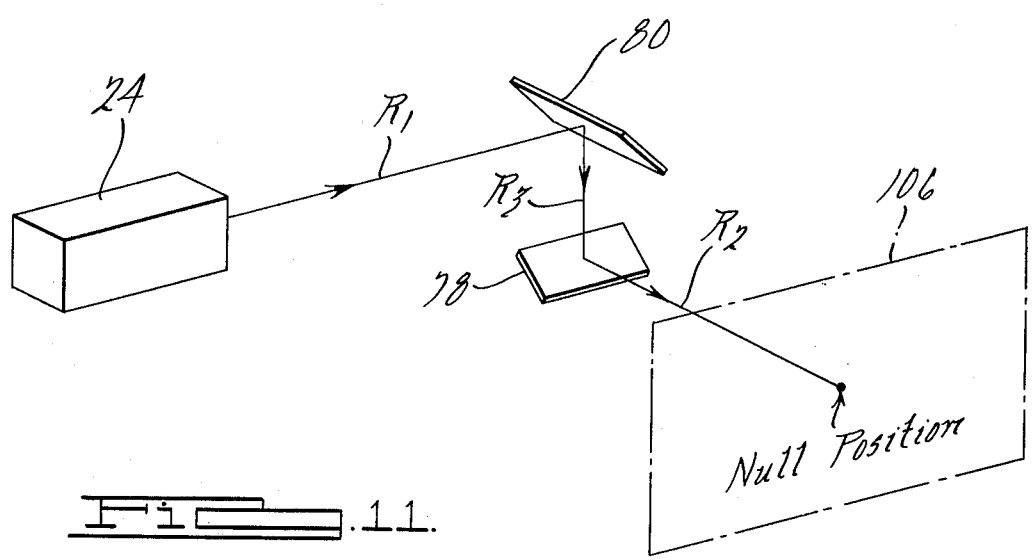
FIGS. 11, 12, and 13 are schematic views of the marking system useful in explaining the system operation.

FIG. 11 is a perspective schematic view which illustrates how scanner unit 32 redirects the laser beam when the galvanometer and mirrors are in the null position. In the null position of the galvanometers and mirrors, the laser beam is redirected by scanner unit 32 directly at the center of an imaginary rectangle 106 which, as will be explained in greater detail hereinafter, marks the perimeter within which a label can be marked on an article.

Mirrors 78, 80 are positionable about the axes of their respective galvanometer shafts over limited angular ranges about either side of the null position. Each galvanometer operates to displace its shaft angularly in proportion to an input signal supplied to the galvanometer from its associated drive amplifier. Thus, for a given signal level of one polarity, the galvanometer shaft is displaced angularly in one direction in an amount corresponding to the signal level, and for a given signal level of opposite polarity, the galvanometer shaft is displaced a corresponding amount in the opposite direction.

Figure 12:
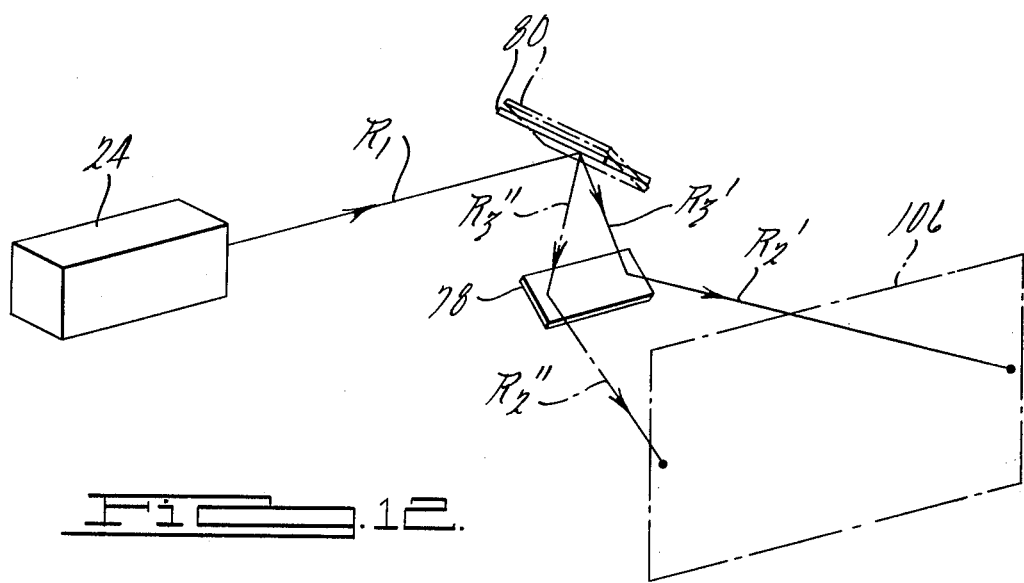
Figure 13:
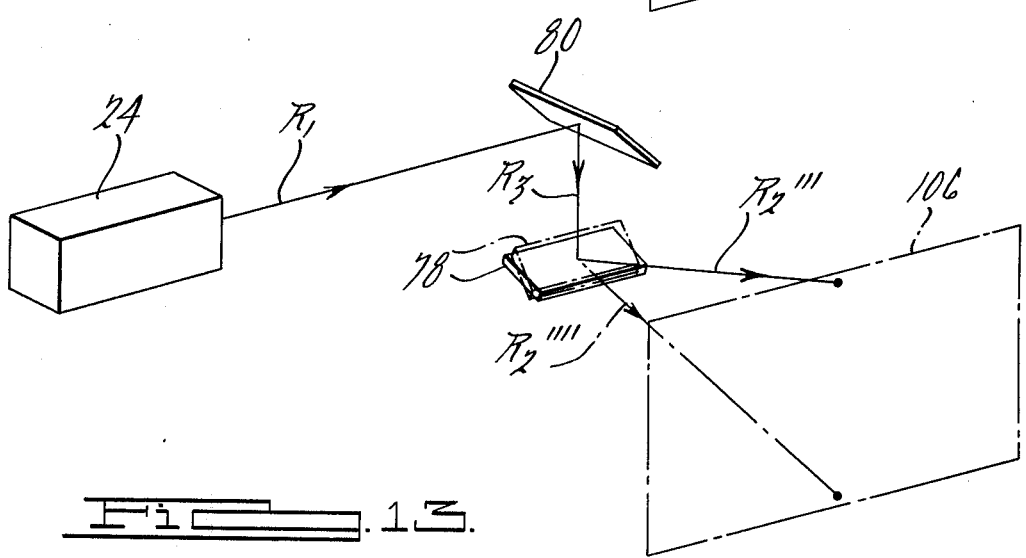
Figure 1B:
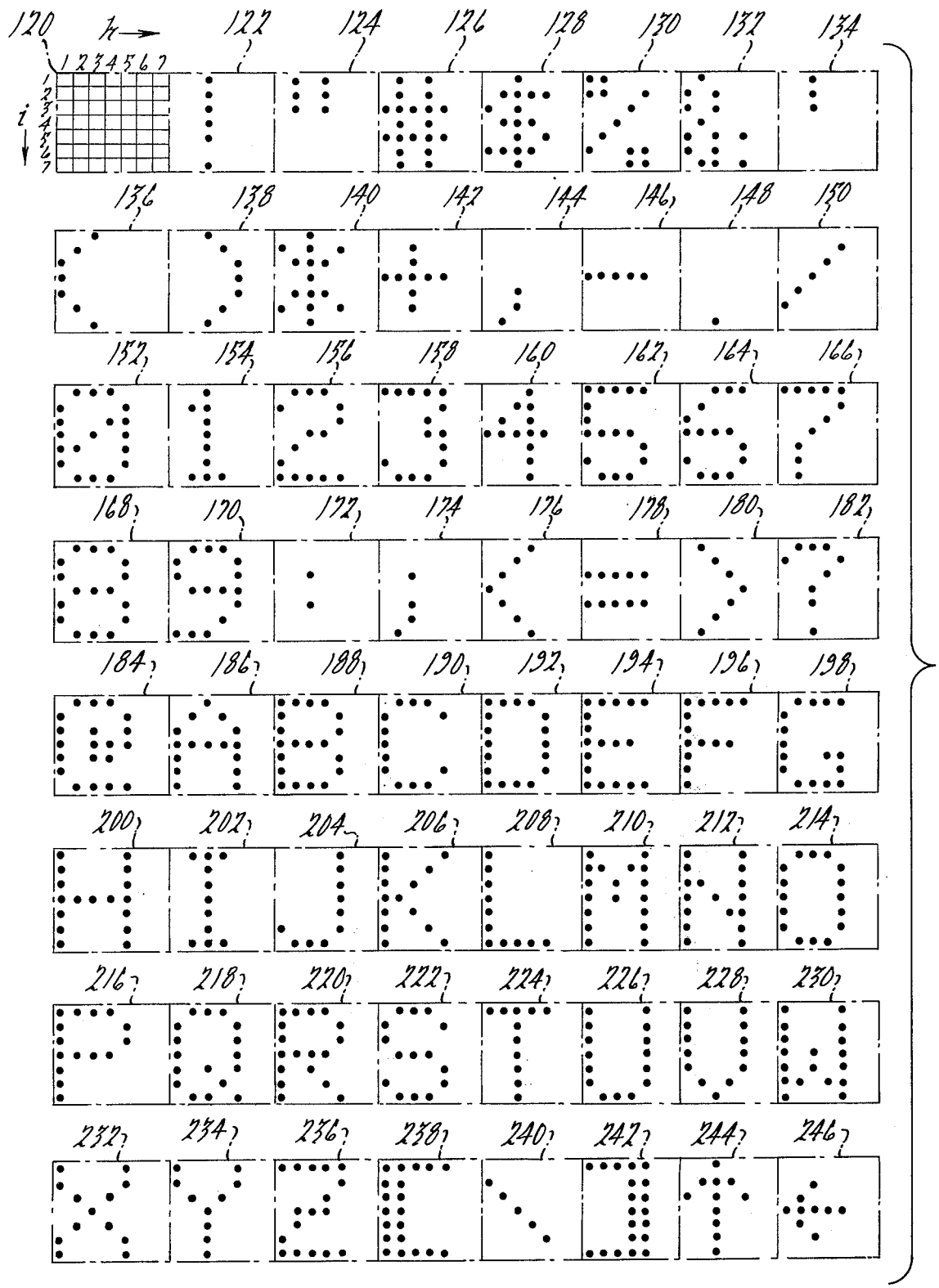

FIGS. 12 and 13 illustrate how the laser beam which exits from scanner unit 32 can be directed anywhere within rectangle 106. FIG. 12 illustrates how the laser beam can be aimed horizontally by positioning horizontal scan mirror 80 via horizontal scan galvanometer 88. Mirror 78 is shown in its null position. The solid-line position of FIG. 12 illustrates mirror 80 displaced angularly from its null position in the counterclockwise direction as viewed in FIG. 5. Since the angle of incidence of the incoming laser beam $R_1$ on mirror 80 is greater than 45°, the laser beam reflects from mirror 80 in the direction $R_3'$ which is at an angle of more than 90° to $R_1$. The beam is then reflected by vertical scan mirror 78 in the direction $R_2'$. The broken-line position of FIG. 12 illustrates mirror 80 displaced angularly from its null position in the clockwise direction as viewed in FIG. 5. Since the angle of incidence of the incoming laser beam $R_1$ is now less than 45°, the beam reflects in the direction $R_3''$ to be subsequently reflected by mirror 78 in the direction $R_2''$. Galvanometer 88 is controlled to position mirror 80 to selected positions between the two positions shown in FIG. 12 and thereby horizontally aim the laser beam to selected positions between the sides of rectangle 106.

FIG. 13 illustrates how the laser beam can be aimed vertically by positioning vertical scan mirror 78 via vertical scan galvanometer 86. Mirror 80 is shown in its null position. The solid-line position of FIG. 13 illustrates mirror 78 displaced angularly from its null position in the counterclockwise direction as viewed in FIG. 3. Since the angle of incidence of the incident laser beam $R_3$ on mirror 78 is less than 45°, the laser beam reflects from mirror 78 in the direction $R_2'''$ which is at an angle of less than 90° to $R_3$. The broken-line position of FIG. 13 illustrates mirror 78 displaced from its null position in the clockwise direction as viewed in FIG. 3. Since the angle of incidence of the incident laser beam on mirror 78 is now greater than 45°, the reflected beam travels in the direction $R_2''''$. Galvanometer 86 is controlled to position mirror 78 to selected positions between the two positions shown in FIG. 13 and thereby vertically aim laser beam to selected positions between the top and bottom of rectangle 106 along positions between the directions $R_2'$ and $R_2''$. Since both mirrors 78 and 80 may be independently positioned by their respective galvanometers, scanning unit 32 is capable of aiming the laser beam anywhere within rectangle 106 by suitably positioning the two mirrors.

In view of the concentrated energy content of the laser beam and the desirability of minimizing the time required to mark an article, it is important that scanner unit 32 be capable of efficiently and accurately reflecting the laser beam. The present invention provides a scanner unit which can efficiently and accurately reflect the laser beam to mark an article with a given label. Especially important are the mirrors and the galvanometers. As mentioned above, the galvanometers and mirrors should exhibit fast and accurate response to command signals in order to minimize the time required to mark an article with a given label. Since increased inertial loads tend to reduce the response and accuracy with which the mirrors may be positioned by the galvanometers, it becomes desirable to minimize the inertia of the galvanometer and its load; for example, by using relatively small galvanometers and mirrors. However, in order to produce a label of a given size, it remains necessary to provide mirror surface areas of at least certain minimum dimensions. Furthermore, since the laser beam energy is concentrated on each mirror, the reflectance and energy dissipation characteristics of the mirrors become important. One aspect of the present invention provides an especially good galvanometer mirror having a sufficiently large reflective area, yet which possesses minimum inertia, exhibits a very high reflectance, and is capable of efficiently dissipating absorbed energy. Such a mirror comprises a thin metal coating, preferably gold or silver, on a silicon substrate. The silicon substrate is, in turn, bonded to an aluminum mount by means of a heat-conductive, high-temperature epoxy, and the mirror mount itself is affixed to the galvanometer shaft. Details of the horizontal and vertical scan mirrors 78 and 80 are shown in FIGS. 6, 7, 8, and 9.

FIGS. 6 and 7 show the details of horizontal scan mirror 78 and FIGS. 8 and 9 the details of vertical scan mirror 80. Each mirror comprises a corresponding silicon substrate 78a, 80a, respectively, on which a thin metallic coating 78b, 80b, respectively, has been deposited. Each silicon substrate is bonded to an aluminum mirror mount 78c, 80c by means of a heat-conductive, high-temperature epoxy which is applied between the mating surfaces of the mirror mount and the silicon substrate. Each aluminum mirror mount 78c, 80c includes a bore 78d, 80d via which the mirror mount is affixed to the output shaft of its corresponding galvanometer. The mirror mount may be locked in place on the galvanometer shaft by means of a set screw at a desired angular orientation relative to the shaft whereby, when the galvanometer is in the null position, the mirrors are oriented in the null positions as shown in FIGS. 3, 4, and 5. The galvanometer mirrors possess an extremely high reflectance on the order of 99.2% or greater at 10.6 microns which is the wave length of the laser beam generated by the disclosed laser system. Accordingly, the mirrors tend to absorb a minimum of the concentrated laser beam energy which is incident thereon. Even though on a percentage basis the mirrors are highly efficient in reflectance, they do absorb some of the laser beam energy as heat; however, the mirror construction permits dissipation of this heat so that potentially damaging temperature build-ups are avoided. Hence, the invention provides an accurate, rapid, efficient scanner unit. As noted earlier in connection with FIG. 2, a heat exchanger 90 could be provided in heat exchange relation with scanner unit 32, if necessary. It is also preferable that the interior of the scanner unit be filled with an inert gas; for example, helium is a suitable inert gas. The helium gas is helpful in providing convective cooling of the mirrors. It is also contemplated that a beryllium mirror could be used even though it is somewhat difficult to machine. Beryllium possesses favorable thermal properties, and overcoated polished beryllium can exhibit a reflectance in excess of 99%.

In view of the fact that both galvanometer mirrors have flat reflecting surfaces and that the galvanometers are angularly positioned in direct proportion to their command signals, there is a slight but increasinng distortion as the beam is aimed farther and farther away from its null position. This is referred to as a "pin cushion" distortion. Insofar as the marking of articles is concerned, pin cushion distortion is essentially unimportant, since the dimensions of the system are chosen to provide a completely legible label even though there may be some minor, unobjectionable distortion in the characters at the fringes of the label. The dimensional relationships involved will be discussed in detail later.

FIG. 10 illustrates details of focusing lens 41 which is used in focusing the laser beam. Lens 41 is mounted witin the bore of a tubular fitting 108 which, in turn, fits within tube 40, lens 41 being inserted into fitting 108 and being held against a shoulder 110 by means of a threaded insert 112 and a spacer 114. Lens 41 is desirably constructed of gallium arsenide and serves to focus the laser beam such that the beam produces a mark of desired size on an article. The particular focal length of the lens required to produce this given size will, of course, depend upon the dimensions involved for the particular specificc marking system. For the beam diameter of the Model 43 laser identified above, a focusing lens with a focal length of one hundred forty-three centimeters was used in a prototype marking system. Further dimensional details of this prototype system will be given later.

Figure 15:
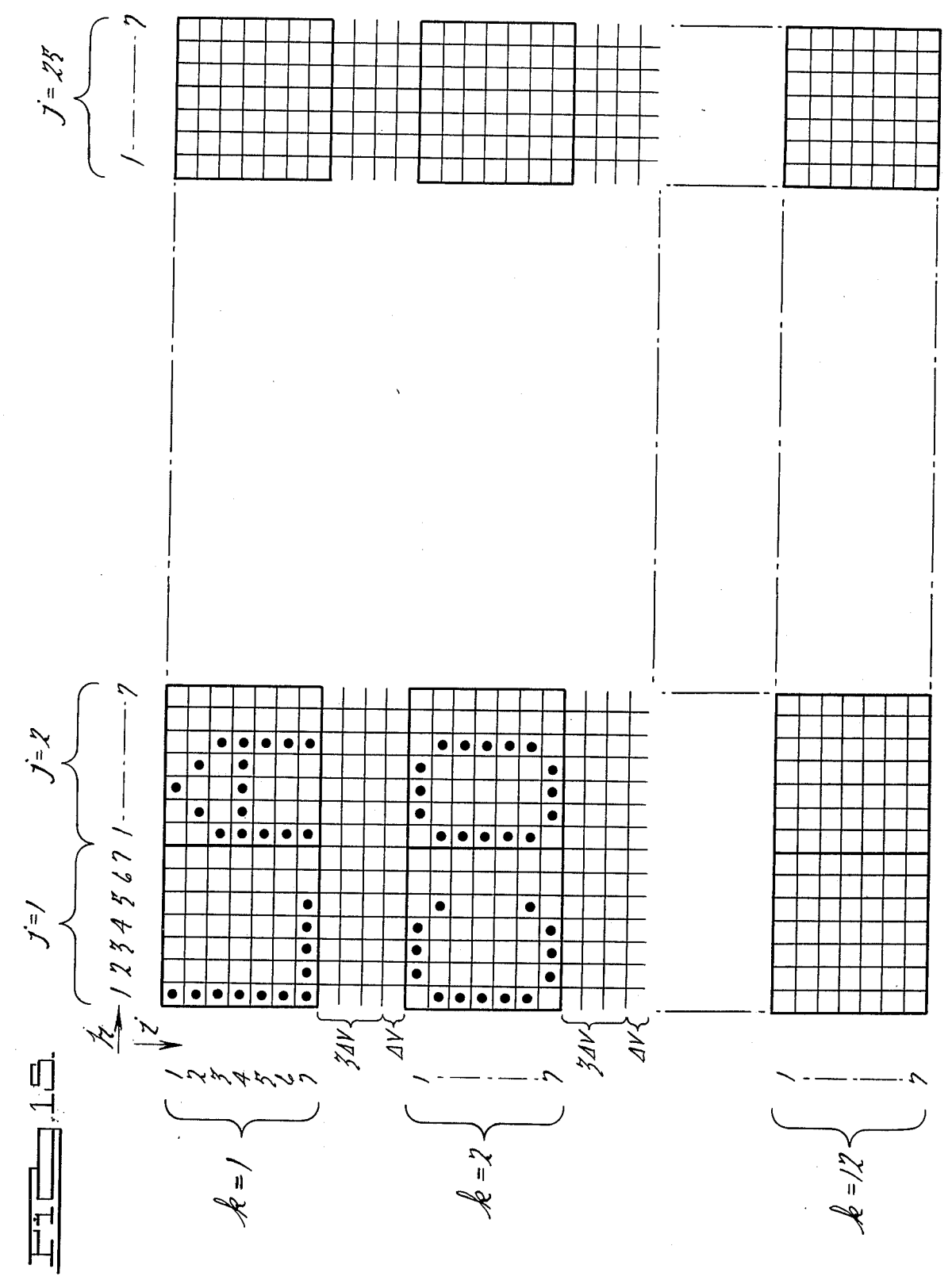

Before proceeding with the description of the construction and operation of processor/controller 28, it will be beneficial to view the form of a finished label as shown in FIGS. 14 and 15. FIG. 14 illustrates a complete shipping label produced by the disclosed marking system. Basically, the label is composed of a number of horizontal rows of alphanumeric and symbolic characters in which the individual characters are aligned in vertical columns. Although the characters in the label of FIG. 14 are illustrated as consisting of individual lines connected together, in actuality each character consists of individual dots which are preferably, although not necessarily, sufficiently large to slightly overlap each other. Each individual dot is produced by means of a single laser beam pulse from laser head 24 as reflected by scanner unit 32. In the illustrated system, labels are produced within the format of a two-dimensional label matrix consisting of twelve horizontal rows and twenty-five vertical columns. A desired character can be marked at any given row and column location. In order to better understand how processor/controller 28 operates to mark a label on an article, the horizontal rows and vertical columns of the label matrix are hereinafter identified by variables $k$ and $j$, respectively. The variable $k$ can assume any value from 1 to 12 inclusive to identify a particular row of the label matrix, while the variable $j$ can assume any value from 1 to 25 inclusive to identify a particular vertical column of the label matrix. Thus, in the illustrated system, it would be possible to generate a label having a maximum of three hundred (12 × 25) characters.

As seen in FIG. 15, however, each individual character is produced within the format of a two-dimensional character matrix consisting of seven horizontal rows and seven vertical columns. Each character consists of one or more dots located at selected row and column locations within the character matrix format. For convenience in understanding the system operation, the horizontal rows and vertical columns of the character matrix are hereinafter identified by variables $i$ and $h$, respectively. The variable $i$ can assume any value from 1 to 7 inclusive to identify a particular row of the character matrix, while the variable $h$ can assume any value from 1 to 7 inclusive to identify a particular column of the character matrix.

The character matrix format is also shown at the upper left-hand corner of FIG. 16 and identified by the numeral 120. The remainder of FIG. 16 illustrates a table of alphanumeric and symbolic characters which are commonly used in making labels. Each of these characters is composed of one or more dots at selected locations within the seven-by-seven character matrix format. Although the imaginary rectangular grid work 120 is not superimposed on the various characters shown in FIG. 16, the dots constituting the various characters are shown at locations within the perimeter of the character matrix at locations whose row and column location may be scaled from the drawing. For example, the dot matrix representation of an exclamation mark shown within the character matrix designated 122 in FIG. 16 is composed of dots in the third column (i.e., at $h = 3$) at the first, second, third, fourth, fifth, and seventh rows (i.e., at $i = 1, 2, 3, 4, 5, 7$). Hence, the dot matrix representation of the illustrated exclamation mark is defined by dots at the following ($h$, $i$) locations of the character matrix: (3,1); (3,2); (3,3); (3,4); (3,5); and (3,7). As will be subsequently appreciated, the definition of each character in terms of the ($h,i$) locations within the character matrix format of the dots constituting its dot representation is useful in the programming of processor/controller 28.

The remaining dot matrix representations shown in FIG. 16 are as follows: the dot matrix representation within the character matrix format 124 is of a quotation mark; within the format 126, a number or pounds symbol; within the format 128, a dollar sign symbol; within the format 130, a percent symbol; within the format 132, an ampersand symbol; within the format 134, an apostrophe; within the format 136, an opening parenthesis; within the format 138, a closing parenthesis; within the format 140, an asterisk; within the format 142, a plus sign; within the format 144, a comma; within the format 146, a hyphen or dash; within the format 148, a period; within the format 150, a slash; within the formats 152 through 170, Arabic numerals zero through nine inclusive; within the format 172, a colon; within the format 174, a semicolon; within the format 176, a "less than" symbol; within the format 178, an equal sign; within the format 180, a "greater than" symbol; within the format 182, a question mark; within the format 184, an "at" symbol; within the formats 180 through 236 inclusive, the English alphabet A through Z inclusive in capitals; within the format 238, an opening bracket; within the format 240, another slash symbol; within the format 242, a closing bracket; within the format 244, an upwardly pointing arrow; and within the format 246, a backwardly pointing arrow.

FIG. 15 illustrates in detail the dot matrix representation of the characters L, A, C, and O at the upper left-hand corner of label matrix format, L being at the location ($j = 1, k = 1$); A being at the location ($j = 2, k = 1$); C being at the location ($j = 1, k = 2$); O being at the location ($j = 2, k = 2$). The remainder of the label detail has not been included in FIG. 15; however, it will be appreciated that the omitted characters are the dot representations (as shown in FIG. 16) of the characters at the designated character positions ($j, k$) of the label (as shown in FIG. 15). It will be observed that the dot representations of the various characters illustrated do not occupy the sixth and seventh columns of the character matrix. In this way, space is automatically provided between immediately adjacent characters in a row to enhance readability of the label. It will also be observed in FIG. 15 that a space equal to four rows of the character matrix format is provided between immediately adjacent label rows. The spacing is equal to a distance $4 \Delta V$ which is subdivided in the drawing into two groups, $3 \Delta V$ and $\Delta V$, for the purpose of hereinafter explaining the detailed operation of the system.

In view of the foregoing description of the details of a label, it can now be appreciated that, for any given label which is to be produced, the label may be defined entirely in terms of the positions of the dots constituting the various characters which constitute a given label. In the portion of the label illustrated in FIG. 15, the letter L occupies the character location in the label matrix defined by ($j = 1$, $k = 1$) and has a dot matrix representation defined by dots at the locations ($h = 1$, $i = 1$); ($h = 1, i = 2$); ($h = 1, i = 3$); ($h = 1, i = 4$); ($h = 1, i = 5$); ($h = 1, i = 6$); ($h = 1, i = 7$); ($h = 2, i = 7$); ($h = 3, i = 7$); ($h = 4, i = 7$); ($n = 5, i = 7$), within the character matrix format. Hence, the letter L at the first row, first column of the label matrix is completely defined by a set of specific values of the four variables ($j$, $k$, $h$, $i$); namely, by ($j = 1, k = 1, h = 1, i = 1$); ($j = 1, k = 1, h = 1, i = 2$); ($j = 1, k = 1, h = 1, i = 3$); ($j = 1, k = 1, h = 1, i = 4$); ($j = 1, k = 1, n = 1, i = 5$); ($j = 1, k = 1, h = 1, i = 6$); ($j = 1, k = 1, h = 1, i = 7$); ($j = 1, k = 1, h = 2, i = 7$); ($j = 1, k = 1, h = 3, i = 7$); ($j = 1, k = 1, h = 4, i = 7$); ($j = 1, k = 1, h = 5, i = 7$). In similar fashion, each of the remaining characters in the label is completely defined by a set of specific values of the four variables ($j, k, h, i$), the location of each dot being defined by a specific value of ($j, k, h, i$). As will become apparent, the laser beam is directed by scanner unit 32 onto an article at discrete locations corresponding to the locations of the individual dots constituting a label. The scanner unit is, however, under the control of processor/controller 28.

Briefly, a label which is to be marked on an article is supplied as an input to processor/controller 28; for example, by teletypewriter 30. The label data is input in a format which is recognizable by processor/controller 28 so that processor/controller 28 assigns each character of the label to a specific character location within the label format (i.e., a location defined by a set specific $j$ and $k$ values). Processor/controller 28 is further programmed to internally store a list containing the dot matrix representation of each individual character which can be marked by the system; for example, the list as shown in FIG. 16. Each character in the stored list is defined by the ($h, i$) locations of its constituent dots; hence, as mentioned above, an exclamation mark would be defined by the following ($h, i$) values: ($h = 3, i = 1$), ($h = 3, i = 2$); ($h = 3, = 3$); ($h = 3, i = 4$); ($h = 3, i = 5$); ($h = 3, i = 7$). Processor/controller 28 is programmed to recognize the particular label character assigned to each particular character location of the label matrix and to scan the internally stored list of dot matrix representations for the specific dot matrix representation of the specific character at each particular character location within the label matrix. Processor/controller 28 compiles a dot matrix representation of the entire label wherein each location at which a dot is to be marked on an article is defined in terms of a set of specific values of the variables ($j, k, h\ i$). However, as will become apparent from the ensuing description, the label is compiled within processor/controller 28 in accordance with the specific program hereinafter described, and it will be appreciated that the compilation should not necessarily denote the existence of the complete dot matrix representation of the entire label at a given instant of time within processor/controller 28. The specific technique herein disclosed involves a scanning method wherein the entire label matrix is scanned for the presence of dots by sequentially loading a shift register with successive portions of a complete label matrix and cycling the loaded shift register to detect the presence and location of dots in that portion of the matrix which has been loaded into the shift register. Processor/controller 28 develops control signals for scanner unit 32 which are functions of the variables ($j, k, h, i$) and represent the locations of the individual dots in a label. The system operates to direct the laser beam from scanner unit 32 to locations on the article being labeled which correspond to the locations of the dots in the label matrix compiled by processor/controller 28.

As mentioned earlier, each galvanometer 86, 88 positions its mirror 78, 80 in accordance with output signals from processor/controller 28 as supplied through interface system 48 and the respective scan drive amplifiers 72 and 70. Processor/controller 28 outputs a vertical control signal for vertical scan galvanometer 86 and a horizontal control signal for horizontal scan galvanometer 88. These signals developed by processor/controller 28 are, however, in digital form. Since galvanometers 86 and 88 each requires an analogue signal input, and, since scan drive amplifiers 72 and 70 each requires an analogue signal input to develop the required analogue signal for the corresponding galvanometer, interface system 48 is constructed to convert the digital horizontal and vertical control signals developed by processor/controller 28 into analogue horizontal and vertical control signals which are supplied to amplifiers 70 and 72. The values of the digital horizontal and vertical signals developed by processor/controller 28 represent the location within the border of a label at which the laser beam is to be aimed by scanner unit 32. Mirror 78 is positioned in accordance with the digital vertical control signal, and mirror 80 in accordance with the digital horizontal control signal such that the location at which the laser beam is aimed by scanner unit 32 is defined by a horizontal position which corresponds to the value of the digital horizontal control signal and by a vertical position which corresponds to the value of the digital vertical control signal. As the values of the digital control signals change, the positions of the scan mirrors change accordingly. In the null position shown in FIG. 11, the digital control signals assume null values and cause null signals to be supplied to the respective galvanometers. Each digital control signal can assume a value over a range of values to cause the scan mirror which it controls to be angularly positioned to a corresponding angular position over a range of angular positions about its null. In the disclosed system, the range of angular positions for each scan mirror is symmetrical about the null, and the magnitude of the angular displacement of each mirror is in proportion to the value of the corresponding digital control signal.

FIG. 18 illustrates details of interfacing system 48 via which the digital horizontal and vertical control signals developed by processor/controller 28 are converted into analogue signals for scan drive amplifiers 70 and 72. As mentioned above, the interfacing system 48 is physically contained on an interfacing board 48a which mounts within processor/controller 28. Also contained on board 48a is pre-existing output circuitry via which output control signals from processor/controller 28 are supplied. Details of this pre-existing circuitry are not shown in FIG. 18; however, the output terminal pins via which these signals are supplied to the interfacing circuitry are shown. Terminal pins 64a, 64b, 64c, and 64d constitute the output terminations of the device and register select channel 64 shown and described in FIG. 2. Terminal pins 66a, 66b, 66c, 66d, 66e, 66f, 66g, 66h, 66i, 66j, 66k, and 66l constitute the output terminations of the data buss channel 66 shown and described in FIG. 2. The signals from processor/controller 28 which appear at these terminal pins are binary logic signals identified as follows: at pin 64a, $\overline{\text{Data Out A}}$ signal; at pin 64b, $\overline{\text{Data Out B}}$ signal; at pin 64c, $\overline{\text{Data Out C}}$ signal; at pin 64d, Device Select signal; at pin 66a, Data 15 signal, at pin 66b, Data 14 signal; at pin 66c, Data 13 signal; at pin 66d, Data 12 signal; at pin 66e, Data 11 signal, at pin 66f, Data 10 signal; at pin 66g, Data 9 signal; at pin 66h, Data 8 signal; at pin 66i, Data 7 signal; at pin 66j, Data 6 signal; at pin 66k, Data 4 signal; and at pin 66l, 10 reset signal.

The signals Data 15, Data 14, ... Data 6 constitute a ten-bit binary word which is supplied via data buss 66 to be loaded into either horizontal position register 52 or vertical position register 56 depending upon the specific clock signal from register clocks circuit 50. This ten-bit word represents the value of either the digital vertical control signal for vertical scan mirror 78 or the horizontal digital control signal for horizontal scan mirror 80. The Data 4 signal constitutes a binary signal which is supplied via data buss channel 66 to be loaded into function register 60. The signals $\overline{\text{Data Out A}}$, $\overline{\text{Data Out B}}$, $\overline{\text{Data Out C}}$, and Device Select constitute logical control signals supplied through device and register select channel 64 to register clocks circuit 50. Particular conditions of these signals cause particular clock signals to be generated by circuit 50 to control the loading of data signals via data buss 66 into horizontal position register 52, vertical position register 56, and function register 60.

Details of interface system are as follows. Register clocks circuit 50 comprises a plurality of circuit elements which are interconnected to provide three output clock signals designated Clk A, Clk B, and Clk C. Register clocks circuit 50 comprises six nand gates 50a, 50b, 50c, 50d, and 50f connected with terminal pins 64a, 64b, 64c, 64d, to develop the Clk A, Clk B, Clk C signals. Gates 50a, 50b, 50c are connected respectively with pins 64a, 64b, 64c to logically invert the signals appearing at terminal pins 64a, 64b, and 64c, respectively, and supply these inverted signals to one input of gates 50d, 50e, and 50f, respectively. Terminal pin 64d, is connected directly to the other input of each gate 50d, 50e, 50f. The Clk A signal is developed at the output of gate 50d; the Clk B signal at the output of gate 50e; and the Clk C signal at the output of gate 50f. Hence, the $\overline{\text{Clk A}}$ signal is generated only when the Device Select signal and the Data Out A signal are simultaneously present; $\overline{\text{Clk B}}$ signal when the Device Select signal and the Data Out B signal are simultaneously present; and the $\overline{\text{Clk C}}$ signal when the Device Select signal and the Data Out C signal are simultaneously present. Processor/controller 28, however, operates such that only one of the signals, Data Out A, Data Out B, Data Out C, can occur at any given time. Hence, only one of the signals $\overline{\text{Clk A}}$, $\overline{\text{Clk B}}$, $\overline{\text{Clk C}}$, can occur at any given time. The $\overline{\text{Clk A}}$ signal is supplied to horizontal position register 52; the $\overline{\text{Clk B}}$ signal to vertical position register 56; and the $\overline{\text{Clk C}}$ signal to function register 60.

Horizontal position register 52 comprises a plurality of 10 flip-flops, each of which has its D terminal connected to a corresponding one of the pins 68a through 68j whereby the ten-bit control signal composed of signals Data 15, ... Data 6 is supplied to the register. The Clk A signal is connected to both inputs of two nands gates 52a, 52b, so that the gates 52a, 52b logically invert the Clk A signal. The output of gate 52a is connected to the C terminal of the first five flip-flops of register 52 while the output of gate 52b is connected to the C terminal of the last five flip-flops of register 52. When the $\overline{\text{Clk A}}$ signal is generated, the ten-bit digital horizontal control appearing at pins 66a through 66j is stored in register 52 with each bit being stored in one of the flip-flops. The stored word is output at the Q terminals of the flip-flops and is designated by individual bits 0H, 1H, ... 9H. Since processor/controller 28 supplies the most significant bit of the 10-bit word as the Data 6 signal with the successive data signals being of decreasing significance up to the Data 15 signal, Bit 9H is the most significant with the significance of the remaining bits decreasing in sequence to the least significant bit, 0H.

Vertical position register 56 comprises a plurality of 10 flip-flops, each of which has its D terminal connected to a corresponding one of the pins 68a through 68j, whereby the ten-bit word composed of signals Data 15, ... Data 6 is also supplied to this register. The Clk B signal is connected to both inputs of two nand gates 56a, 56b so that the gates 56a, 56b logically invert the Clk B signal. The output of gate 56a is connected to the C terminal of the first five flip-flops of register 56, while the output of gage 56b is connected to the C terminal of the last five flip-flops of register 56. When the $\overline{\text{Clk B}}$ signal is generated, the 10-bit data word appearing at pins 66a through 66j is stored in register 56 with each bit being stored in one of the flip-flops. The stored word is output at the Q terminals of the flip-flops and is designated by individual bits 0V, 1V, ... 9V. Since processor/controller 28 supplies the most significant bit of the 10-bit word as the Data 6 signal with the successive data signals being of decreasing significance up to the Data 15 signal, Bit 9V is the most significant with the significance of the remaining bits decreasing in sequence to the lease significant bit, 0V.

The 10-bit word stored in horizontal position register 52 is supplied to the input of horizontal digital-to-analogue converter 54 with each of the data bit signals 0H through 9H being supplied to a corresponding input terminal of converter 54. Similarly, the ten-bit word stored in vertical position register 56 is supplied to vertical digital-to-analogue converter 58 with each individual bit 0V through 9V being supplied to a corresponding input terminal of converter 58. Each digital-to-analogue converter 54, 58 provides an output signal via its output channel 69, 71 whose magnitude is determined by the value of the ten-bit binary word input. By way of example, suitable digital-to-analogue converters are commercially available from Cycon, Inc., Sunnyvale, Calif., as Model CY 2135. These specific converters provide a voltage signal whose magnitude and polarity are determined by the value of the 10-bit input word. Since the 10-bit binary word input to each register is capable of $2^{10}$ possible different values, the analogue output signal developed by each converter can assume $2^{10}$ different analogue values. These possible values define a range which may be used to operate the corresponding galvanometer and scan mirror over a corresponding range of angular displacements. However, as will be seen later, only a portion of the available range is used for both the horizontal and vertical digital control signals which are developed by processor/controller 28. In other words, only a fraction of the $2^{10}$ possible values of the 10-bit data words are used. If it is assumed the the midpoint of each range of $2^{10}$ positions defines the null position of the corresponding galvanometer and mirror as shown and described above in FIG. 11, the galvanometers and mirrors may be displaced about their null positions in substantially equal amounts on either side of the null as the 10-bit binary control signal increases and decreases from its null value.

An especially advantageous feature which is included in the system provides both horizontal and vertical scaling of the analogue signals developed by converters 54 and 58. A voltage dividing network comprising a potentiometer 69a and a resistor 69b is connected across the output of horizontal digital-to-analogue converter 54 with the signal supplied to horizontal scan drive amplifier 70 being taken across resistor 69b. Similarly, a voltage dividing network comprising a potentiometer 71a and a resistor 71b is connected across the output of vertical digital-to-analogue converter 58 with the signal to vertical scan drive amplifier 72 being taken across resistor 71b. By varying the setting of the respective potentiometers 69a, 71a, a selected fraction of the output of each converter is supplied to the respective scan drive amplifiers. Hence, the analogue signals may be scaled by the potentiometers to provide a convenient scaling of galvanometer angular displacements and, hence, scaling of the vertical and horizontal dimensions of a label which is to be marked on an article.

The Clk C signal is supplied to function register 60. Function register 60 comprises a nand gate 60a connected to invert Clk C signal and a flip-flop 60c having one input connected to the output of gate 60a. The other terminal of flip-flop 60c connects to terminal pin 66k. Another terminal of flip-flop 60c connects through an inverter 60b to terminal pin 66l. The output of flip-flop 60c connects to a pulse driver 62 which provides an output pulse via channel 68 to the laser system. The IORESET signal, available from terminal pin 66l, is automatically generated by processor/controller 28 when it is initially powered-up. The IORESET signal causes flip-flop 60c to have an output which keeps the laser turned off. This insures that no signals generated as the processor/controller 28 is powered-up can inadvertently cause the laser to pulse.

Figure 17A:
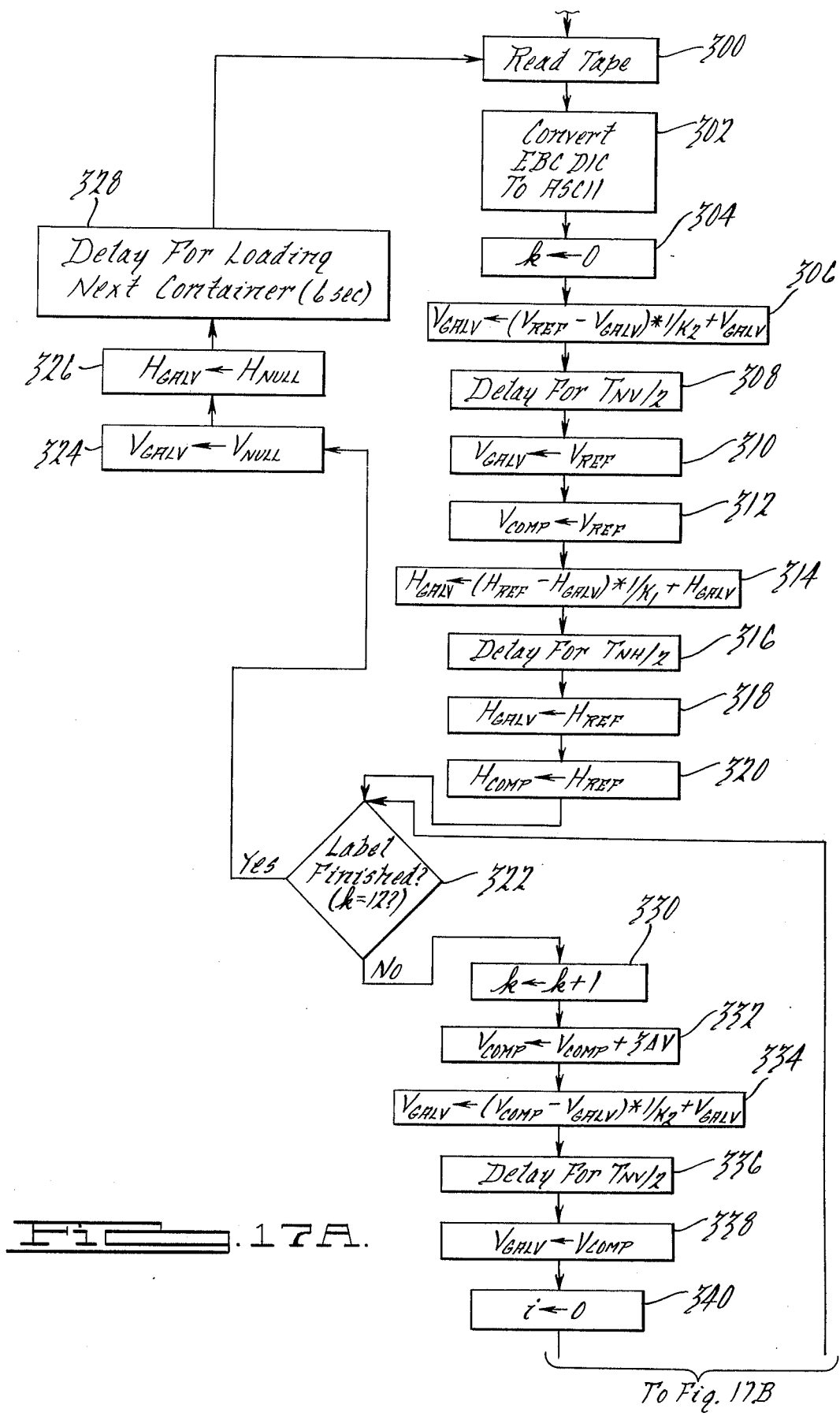
FIGS. 17A, 17B, and 17C are to be considered together and constitute a flow diagram illustrating the operational details of the system.
Figure 17B:
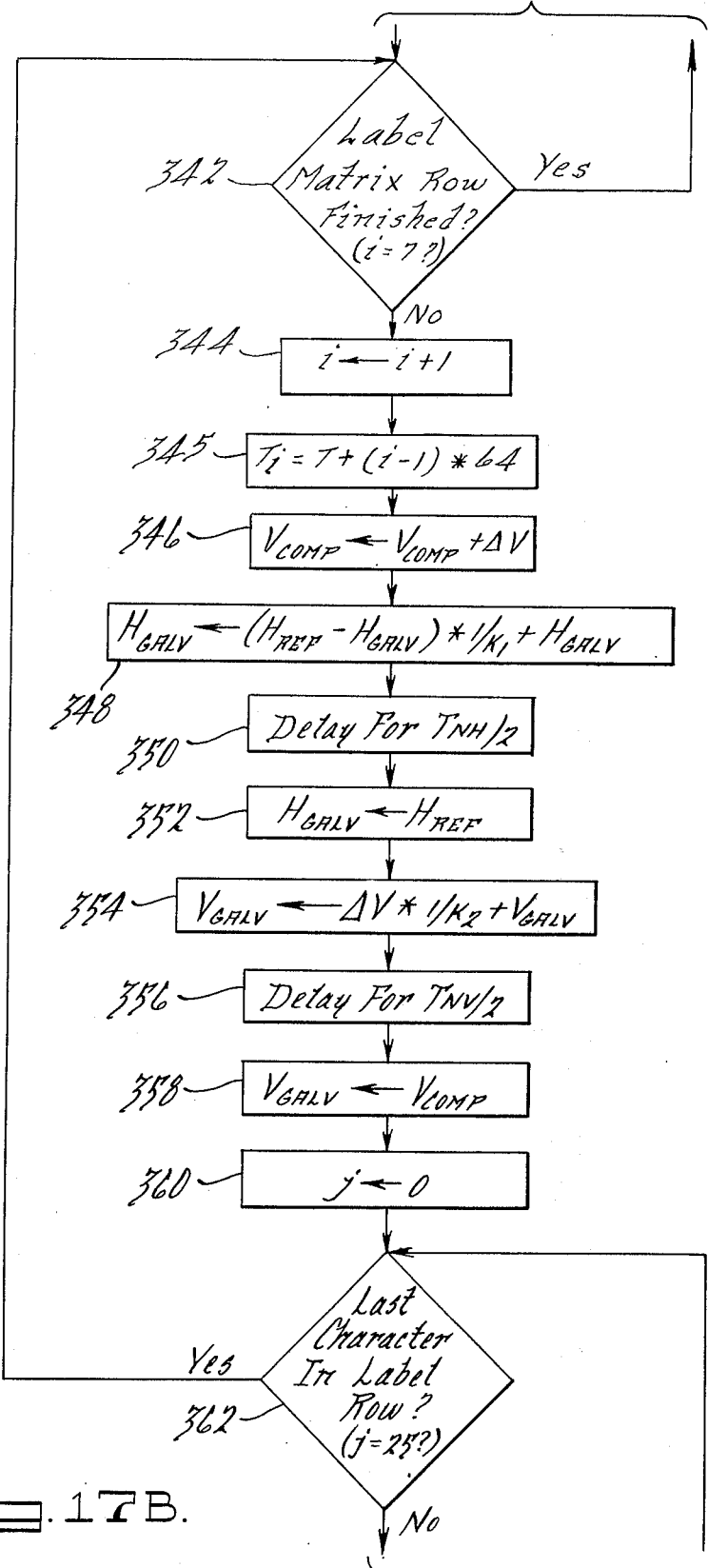
Figure 17C:
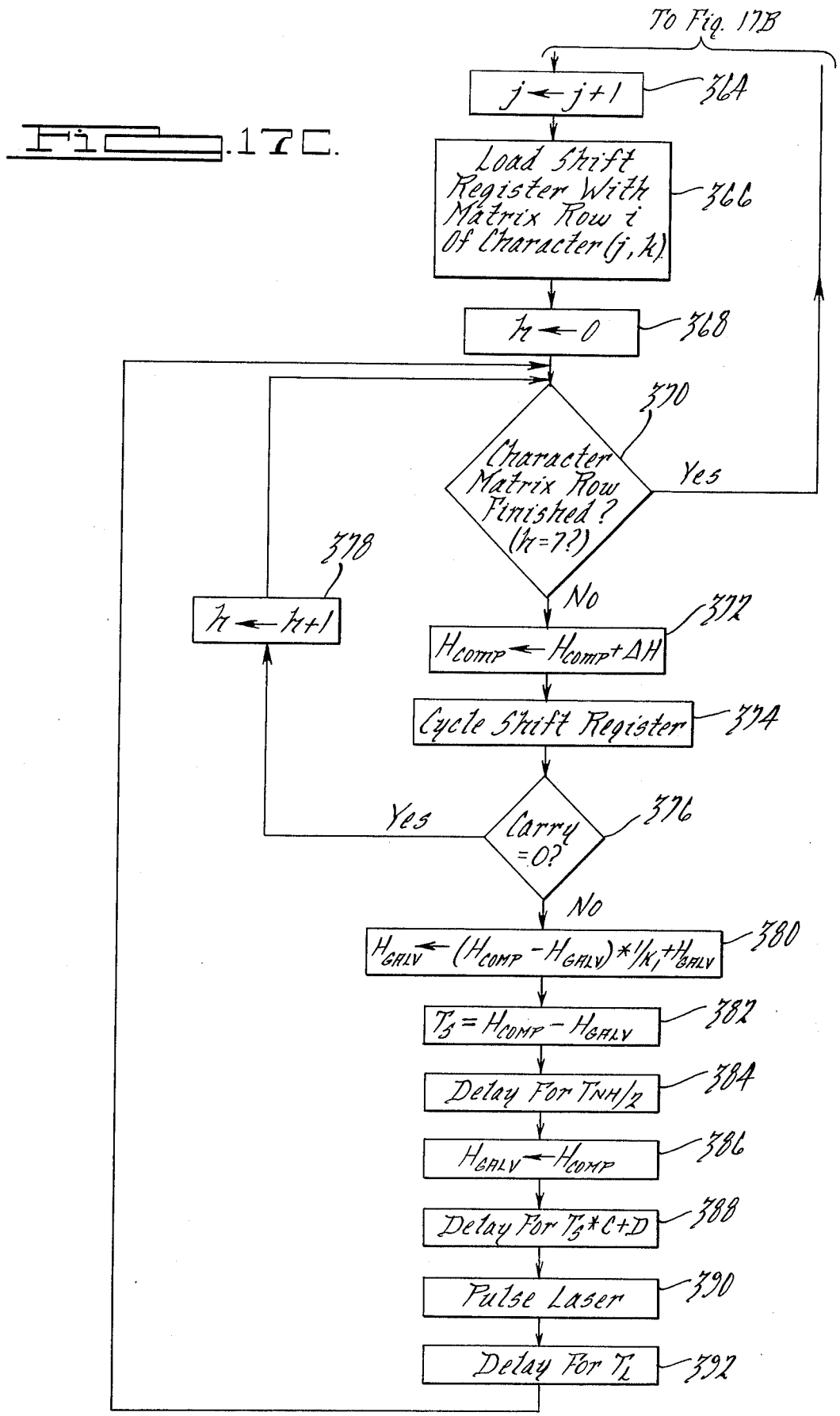

Details of the manner in which processor/controller 28 operates can now be explained. FIGS. 17A, 17B, and 17C disclose a detailed flow diagram of the operation of processor/controller 28. The specific programming details for the disclosed model of processor/controller 28 can be developed to execute the disclosed flow diagram in accordance with known programming techniques.

Preparatory to executing the steps shown in FIGS. 17A, 17B, and 17C, certain data which is used for calculations performed by processor/controller 28 is loaded into suitable data storage locations in processor/controller 28. This data includes the following constants: $V_{REF}$; $H_{REF}$; $V_{NULL}$; $H_{NULL}$; $K_1$; $K_2$; $\Delta V$; $\Delta H$; C; D. The significance of these constants will be seen in the explanation of the flow diagram hereinafter. Certain registers of processor/controller 28 are also allocated for storing the values of certain variables. These include: an index register for each of the variables $h, i, j, k$; a storage register for storing each of the variables: $V_{COMP}$; $H_{COMP}$; $V_{GALV}$; and $H_{GALV}$. These latter two variables, $V_{GALV}$ and $H_{GALV}$, represent respectively the digital vertical control signal and the digital horizontal control signal which are provided via data buss 66 to interfacing system 48 for positioning the respective scan mirrors.

The dot matrix representations of various alphanumeric and symbolic characters (for example, those shown in FIG. 16) are also stored in suitable storage locations of processor/controller 28. Each dot matrix representation is stored within processor/controller 28 in a character matrix format which corresponds to the seven-by-seven $(h, i)$ dot matrix character format described earlier. The stored character matrix for a given character contains bits at locations corresponding to the locations of the dots in the dot matrix representation of the character as referenced to the $(h, i)$ dot character matrix format. The disclosed system uses a logical 1 to indicate the presence of a dot and a logical 0 to indicate the absence of a dot. Hence, for example, the stored character matrix for the letter L would be:

|   | h |   |   |   |   |   |   |
|---|---|---|---|---|---|---|---|
|   | 1 | 0 | 0 | 0 | 0 | 0 | 0 |
|   | 1 | 0 | 0 | 0 | 0 | 0 | 0 |
|   | 1 | 0 | 0 | 0 | 0 | 0 | 0 |
| i | 1 | 0 | 0 | 0 | 0 | 0 | 0 |
|   | 1 | 0 | 0 | 0 | 0 | 0 | 0 |
|   | 1 | 0 | 0 | 0 | 0 | 0 | 0 |
|   | 1 | 1 | 1 | 1 | 1 | 0 | 0 |

The stored character matrices constitute a stored list of characters within processor/controller 28. However, the complete character matrix is not stored within processor/controller 28 in a contiguous fashion. Rather, the bit patterns are stored in a series of seven linear tables. The first table stores the bit patterns for the $i = 1$ row of the character matrices. The second table stores the patterns for the $i = 2$ row and so on to the seventh table which stores the $i = 7$ row of the character matrices. Each storage position in each table is capable of holding a 16 bit pattern. If each of the 16-bit storage locations is considered as two 8-bit "bytes" located side-by-side, then each 7-bit character matrix row is stored in its table position left justified in the right hand byte. As will be explained, processor/controller 28 compiles a complete label composed from matrices in the list as selected pursuant to the label information input to the system.

Attention is now directed to the top of FIG. 17A which illustrates the beginning of the flow diagram. The step designated by the block 300 indicates that a label which is to be marked on an article is read from a magnetic tape into processor/controller 28. The label information is in EBCDIC; that is, the bit pattern used as a code for a given character conforms to EBCDIC. The next step designated by the block 302 indicates that the label is converted from EBCDIC to ASC II for use by processor/controller 28. The label information now conforms to the characterization generated by the teletypewriter when it is used as the label input device. Processor/controller 28 assigns each character of the label to a given $(j, k)$ location within the label matrix format. The next step designated by block 304 indicates that the index register which counts the variable $k$ is set to zero.

The steps designated by blocks 306, 308, 310, 312; 314, 316, 318, and 320 should be considered together. Essentially, these steps cause the horizontal and vertical scan mirrors of scanner unit 32 to be positioned to respective positions whereby a beam from laser head 24 would be directed to a reference position just outside of the imaginary rectangle 106 which defines the perimeter of a label. Specifically, the position is four character rows above and one character column to the left of the upper left-hand corner of the label matrix position defined by $j = 1, k = 1, h = 1, i = 1$. The constant $V_{REF}$ represents that value of the variable $V_{GALV}$ which causes vertical scan mirror 78 to be positioned to such a location, and the constant $H_{REF}$ represents the value of the variable $H_{GALV}$ which causes horizontal scan mirror 80 to be positioned to such a location. The specific technique incorporated in the steps designated by the blocks 306 to 320 is especially advantageous for positioning the scanner mirrors, since it provides accurate and reasonably expeditious positioning without being complicated to implement.

Briefly, the theory underlying this technique is as follows. It has been found that each scan galvanometer and mirror is an underdamped, substantially linear system. This means that, in response to a step input command signal commanding it to a certain commanded position different from its current position, the scan mirror will overshoot the commanded position and then oscillate about the commanded position with a decreasing amplitude of oscillation until the oscillation eases with the mirror stopping at the commanded position. Hence, in the case of the vertical scan galvanometer and mirror, if the value of $V_{GALV}$ changes (this change constituting a step input command signal to the vertical scan galvanometer), the vertical scan mirror will initially overshoot its oscillation to the commanded position. Since in generating a label with the marking system according to the present invention it is desirable to minimize the label production time and to provide precise aiming of the laser beam at the article being marked, it is especially desirable that the scan mirrors be positioned precisely to their commanded positions rapidly and without oscillation about their commanded positions. The herein disclosed positioning technique for positioning the scan mirrors is especially significant. Because of the linearity of each galvanometer-mirror system, the amount by which a mirror overshoots its commanded position is a substantially constant percentage of the distance between its initial position and its commanded position, and the time required for the mirror to be displaced from initial position to its maximum overshoot position remains substantially constant even though the difference between the commanded and initial positions will depend upon the desired displacement of the mirror. Accordingly, each galvanometer-mirror system may be characterized by a pair of constants; namely, an overshoot constant and a time constant. The overshoot constant is a fraction less than one and is equal to: (the commanded position minus the initial position) divided by (the maximum overshoot position minus the initial position). The overshoot constant for the particular galvanometer-mirror system maybe determined empirically. Hereinafter, the overshoot constant for the vertical scan galvanometer-mirror system is designated $1/K_2$, and the overshoot constant for the horizontal scan galvanometer-mirror system is designated $1/K_1$. The time constant for each galvanometer-mirror system may also be empirically determined. The time constant is equal to the time required for a mirror to be displaced from its initial position to its maximum overshoot position in response to a step input command signal. The time constant for the vertical galvanometer-mirror system is hereinafter designated $T_{NV}/2$, and the time constant for the horizontal galvanometer-mirror system is designated $T_{NH}/2$.

The disclosed mirror positioning technique for positioning a mirror from an initial position to a commanded position is essentially a "two-stage" process which takes advantage of the overshoot and time constants associated with each galvanometer-mirror system to minimize the time required to displace a mirror from its initial position to its commanded position. The first stage consists of supplying to the galvanometer an initial step command signal which is equal to the desired amount of mirror displacement multiplied by the overshoot constant for the galvanometer-mirror system. This initial step command signal is supplied to the galvanometer for a duration equal to the time constant of the system. Because of the inherent overshoot of the galvanometer-mirror system, this particular technique results in the galvanometer-mirror being positioned substantially exactly at its commanded position at the end of the time period defined by the time constant of the system. The second stage of the technique consists of supplying to the galvanometer immediately at the conclusion of the time period defined by the time constant a final command signal which is exactly equal to the commanded position. At the instant at which the final command signal is supplied to the galvanometer, the mirror is at the maximum overshoot position in response to the initial step command signal. However, this position is precisely the commanded position. Therefore, when the final command signal is supplied to the galvanometer, the mirror is substantially exactly at the commanded position and, hence, stops immediately at this position without subsequentoscillation. It will therefore be appreciated from the foregoing description of the disclosed positioning technique for positioning the galvanometer-mirrors that such positioning is accomplished accurately, expeditiously, and without oscillation about the commanded position.

Continuing with the flow diagram, the sequence of steps indicated at 306, 308, and 310 represents the "two-stage" positioning technique for positioning the vertical scan mirror from its existing position to the $V_{REF}$ position. Accordingly, at the conclusion of the step shown a 310, the vertical scan mirror is at the $V_{REF}$ position with the value of the command signal, $V_{GALV}$, equaling $V_{REF}$. The next step 312 indicates that the variable $V_{COMP}$ is assigned the value $V_{REF}$.

The sequence of steps shown at 314, 316, and 318 represents the "two-stage" positioning technique by which the horizontal scan mirror is positioned from its existing position to the $H_{REF}$ position. Accordingly, immediately upon the execution of the step designated at 318, the horizontal scan mirror is at the $H_{REF}$ position with the command signal $H_{GALV}$ supplied from processor/controller 28 equaling $H_{REF}$. The next step shown at 320 indicates that the variable $H_{COMP}$ is assigned the value $H_{REF}$.

The next sequence of steps beginning with step 322 and continuing through the steps 330, 332, 334, 336, 338, 340, 342, 344, 346, 348, 350, 352, 354, 356, and 358 causes the scan mirrors to be positioned to respective positions whereby a beam from laser head 24 would be directed just outside the upper left-hand corner of the label perimeter as viewed in FIG. 15 at a position aligned vertically with the first character matrix row of the first label matrix row and horizontally one character matrix column to the left of the first character matrix column of the first label matrix column. This sequence of steps is executed during the initial pass through the flow diagram before any marking occurs.

Therefore, after the execution of step 320, step 322 is executed. Step 322 tests if the value of the variable $k$ is equal to twelve. Since the variable $k$ has been set to zero at the step 304 during the initial pass through the flow diagram, the test is negative, and, therefore, step 330 is executed. As will be seen in greater detail later, the step executed by the block 322 determines if a label has been completed, the variable $k$ having a value equal to twelve when the label is complete. If the label has been completed, steps 324, 326, and 328 are executed to return control back to step 300 at the beginning of the flow diagram in preparation for the generation of the next label. However, unless $k$ does equal twelve, control is from step 322 to step 330. The step 330 indicates that the value of the variable $k$ is incremented by one. Hence, during the first pass through steps 332 to 340, $k = 1$. The step shown at 332 increments the value of the variable $V_{COMP}$ by an increment equal to $3\Delta V$. $\Delta V$ represents a displacement equal to one row of the character matrix. Execution of steps 334, 336, and 338 result in the vertical scan mirror being positioned in accordance with the mirror positioning technique to a new position whereby a beam from laser head 24 would be directed to a position three rows of a character matrix below the $V_{REF}$ position.

Step 340 causes the value of the variable $i$ to be set to zero. The next step 342 tests if the value of the variable $i$ equals seven. Since the variable $i$ has just been set to zero at step 340, the test is negative, and, therefore, step 344 is executed. As will be seen later, step 342 determines if a label matrix row has been finished. Step 344 increments the value of the variable $i$ by one so that $i$ now equals one. Step 345 calculates the starting location for the $i^{th}$ character matrix table. T is the location of the start of the first table. Steps 348, 350, and 352 cause the horizontal scan mirror to be positioned to the $H_{REF}$ position. However, since the horizontal scan mirror is actually in the $H_{REF}$ position during the initial pass through these steps, there is no resulting displacement of the horizontal scan mirror at this time. Steps 346, 354, 356, and 358 cause the vertical scan mirror to be positioned one row of a character matrix below its existing position whereby a beam from laser head 24 would be directed vertically in alignement with the first character matrix row of the first label row (i.e., at $k = 1$, $i = 1$). However, it will be recalled that the horizontal mirror is presently in a position whereby the laser beam would be aimed horizontally one character matrix column to the left of the first character matrix column in the label matrix.

The step 360 is next executed and causes the value of the variable $j$ to be set to zero. Step 362 thereafter is executed to test if the value of the variable $j$ equals 25. Since $j$ has just been set to zero at step 360, the test is negative and step 364 is executed. As will be seen later, step 362 determines if the last character in a label row has been scanned. Step 364 causes the value of the variable $j$ to be incremented by one, and therefore, during the first pass through, the value of the variable $j$ now equals one.

The next step to be executed is 366. Since each character used in the label is represented by a six-bit binary code (the ASC II representation), that six-bit word may be used as an entry into the character matrix table. Processor/controller 28 adds the six-bit character code (for the character at the label position designated by the value of the variables $j$ and $k$) to $T_i$ to generate an address in the $i^{th}$ table. As previously described, the dot matrix representation for the $i^{th}$ row of the character is stored in that location. The contents of that location are then loaded into a register and the bytes are swapped (i.e., the left-hand byte becomes the right-hand byte and vice versa). Since $i = 1, j = 1$, and $k = 1$, processor/controller 28 determines which character is in the first row, first column, of the label matrix. In the illustrated example, this character is the letter L. After determining the table address for the first table ($i = 1$) entry for the letter L, the contents are loaded into the register and the bytes swapped. Thus, the register contains the following bit pattern:

1 0 0 0 0 0 0 0 0 0 0 0 0 0 0 0

Step 368 is next executed. This causes the value of the variable $h$ to be set to zero. The next step shown at 370 tests whether the character matrix row is finished by testing if the variable $h = 7$. If $h$ does, in fact, equal seven, control is transferred via the return loop to step 362. However, during the first pass through the flow diagram, $h$ does not equal seven since it has just been set to zero at step 368. Hence, step 372 is executed. Step 372 causes the value of $H_{COMP}$ to be incremented by $\Delta H$, $\Delta H$ being one column of the character matrix. Step 374 is now executed which cycles the register into which the matrix row $i$ of character $j$, $k$ has been loaded. A cycle of the shift register causes the bits to be shifted one place to the left through the register. An extra bit is associated with the register. This bit represents the carry. When the register is cycled through a shift, the bit which is shifted "out of" the register is transferred into the carry bit. Hence, with the illustrated example, the very first cycle of the shift register causes a 1 to be moved into the carry bit. Step 376 tests if the carry bit is 1 or a 0. If the carry is a 0, control transfers directly to step 378. However, if the carry is a 1, this indicates the presence of a dot at that position, and it is therefore necessary to appropriately position the scan mirrors and to cycle the laser so that a mark is made at the corresponding location on the article beng marked. Step 382 is a calculation carried out within processor/controller 28 whereby the difference between the present values of the signals $H_{COMP}$ and $H_{GALV}$ is determined. This calculation is identified by $T_S$ and is used to provide a delay as indicated at 388. The steps designated at 380, 384, and 386 cause the horizontal scan galvanometer to be positioned in accordance with the value of the variable $H_{COMP}$. As will be appreciated from the step 318 above, the present position of the horizontal scan mirror is such that the laser beam would be aimed horizontally at the position $H_{REF}$. As will also be appreciated from the steps 320 and 372, the present value of $H_{COMP}$ is equal to $H_{REF}$ plus $\Delta H$. Accordingly, the program indicates that a mark should be made at $H_{COMP}$ whereas the horizontal scan mirror is presently being aimed at the $H_{REF}$ position. Accordingly, steps 380, 384, and 386 cause the horizontal scan mirror to be positioned horizontally at the first character column of the first label column; i.e., $h = 1, j = 1$. An extra delay is provided by step 388 to guarantee that the mirror is motionless. Next, step 390 causes a signal to be supplied to the laser system whereby the laser head generates a pulsed laser beam which is reflected by scanner unit 32 onto the article at the location corresponding to the position $j = 1, k = 1, h = 1, i = 1$ of the label matrix. A mark is thereby made on the article forming a portion of the letter L. A delay is provided by step 392 to compensate for a slight random characteristic in the generation of the pulsed laser beam in response to the input signal to the laser system. Step 378 is exectued which increments the value of the variable $h$ by one so that $h$ now equals one.

Control now returns to step 370 which, again, tests the value of $h$. Since the value of $h$ is now one, steps 372 and 374 and 376 are again executed. Now, however, the carry is a 0, and control directly returns from step 376 to step 378. Since the remaining carries for the shift register will be 0, $h$ will equal seven after the shift register has been cycled for the seventh time. It will be noted that, each time the shift register is cycled, the value of $H_{COMP}$ is incremented by $\Delta H$. Hence, when step 370 detects that the variable $h = 7$, the value of $H_{COMP}$ is actually equal to $H_{REF} + 7 \Delta H$. However, the horizontal scan mirror remains at the position to which it was displaced to cause the first mark to be made on the article.

The detection of the condition $h = 7$ indicates that a complete character matrix row of a single character matrix has been scanned and control is therefore returned to step 362. Step 362 tests if $j = 25$, but since $j$ presently equals one, control transfers to step 364 which increments the value of $j$ by one so that $j$ now equals two. However, $k$ and $i$ still equal one. Therefore, when step 366 is now executed, processor/controller 28 addresses the first table for the dot matrix representation of the character at the second column ($j = 2$) of the first row ($k = 1$) of the label matrix. In the example, this character is the letter A. Accordingly, processor/controller 28 loads the shift register with the contents of the letter A address of the first table and swaps bytes, yielding:

0 0 1 0 0 0 0 0 0 0 0 0 0 0 0 0

$h$ is set to zero at step 368; step 370 detects that $h$ is zero; step 372 increments the value of $H_{COMP}$ by $\Delta H$; and step 374 causes the shift register to cycle. Since the first carry is 0, control is to step 378 which increments the value of $h$ by one. Since $h$ now equals one, $H_{COMP}$ is again incremented by $\Delta H$ and the shift register is again cycled for the second time during this loading. Since the second carry is 0, $h$ is incremented to three. $H_{COMP}$ is again incremented by $\Delta H$, and the shift register is cycled for the third time. How, however, the carry is a 1, and, therefore, steps 380, 382, 384, 386, 388, 390, and 392 are executed whereby the horizontal scan galvanometer-mirror is positioned to a position corresponding to the location of the dot at the location $j = 2, k = 1, h = 3, i = 1$, and the laser is pulsed to cause a mark to be made at a corresponding location on the article. Since the remaining bits in the shift register are all zeros, the loop from step 376 back through step 378 to step 370 is repeated until $h = 7$ at which time control is again transferred back to step 362. Since $j$ does not yet equal 25, steps 364, 366 are executed whereby the first character matrix row of the character at the third column of the first label matrix row is suitably loaded into the register. This process is repeated until the entire first character matrix row, $i = 1$, of the first label matrix row ($h = 1$) has been scanned across the full width of the label from $j = 1$ to $j = 25$. Hence, each time a complete row of a single character matrix has been scanned (with dots being marked in the appropriate positions on the article corresponding to positions at which a 1 has been detected), control returns to step 362. When step 362 detects the condition $j = 25$, this indicates that a single character matrix row has been scanned in each of the 25 character matrices extending across the complete label. When this happens, control is returned to step 342.

Since $i = 1$ at the conclusion of the scan across the first character matrix row of the first label matrix row, step 344 is executed to increment the value of $i$ by one. Steps 346 through 358 are executed whereby the horizontal and vertical scan mirrors are positioned to positions whereby the laser beam would be directed in vertical alignment with the second character matrix row of the first label matrix row and horizontally at the $H_{REF}$ position. Next, $j$ is set to zero at step 360, and control passes through steps 362, 364 to step 366 to load the shift register with further information for marking the label. The process continues in the same manner as described in connection with the first character matrix row of the first label matrix row described above. In like fashion, the remaining character matrix rows are scanned for the remainder of the first label matrix row.

When the first label matrix row has been completed, control returns to step 322, Hence, after the first label matrix row has been completed, step 322 will be followed by step 330 which increments the variable $k$ by one. Steps 332 through 338 are executed to position the vertical scan mirror so that a beam for the laser would be directed to a position 3 $\Delta$ V below the last character matrix row of the first label matrix row. Step 340 is then executed to set $i$ to zero, and control passes to step 342 and the remaining steps. The second label matrix row will be scanned in the same fashion as the first label matrix row with appropriate dots being marked on the article in accordance with the characters present in the second label matrix row.

The process continues in this fashion until the entire label has been scanned at which time step 322 will detect the condition $k = 12$. When this happens, steps 324, 326, and 328 are executed which cause the galvanometer mirrors to be positioned to the null positions and a delay occurs to permit the next article to be loaded into position for marking. This completes the generation of a complete label.

In constructing an embodiment of the invention, the specific dimensions of various components and the dimensional relationships between the various components in the system are important to obtaining an optimum system. In a prototype system having the capability of generating a three-hundred character label within the 12 × 25 character label format as described above, a label size of approximately 7½ inches × 10 inches was successfully produced with efficiency and with legibility. In order to successfully generate such a label, a certain dot size for the dots marked on the article is required. In turn, the size of this dot depends to some extent upon the particular material which is being marked but, to a greater extent, upon the diameter of the laser beam as it strikes the article. While these criteria are important in determining the legibility of the label, other criteria are important in minimizing the production time required for a given label. These other criteria include the size and response characteristics of the scan galvanometers and mirrors. As not before, it is desirable to have a minimum inertia load on each galvanometer, yet it is also necessary to provide a certain minimum mirror size. Further, the galvanometers must be sufficiently responsive and accurate to be capable of positioning their mirrors to individual positions within a range of positions corresponding to the number of individual rows and columns at which a dot may be marked on an article within the given label format. This means that, to generate a label as disclosed herein, it is necessary that the horizontal scan galvanometer be capable of accurately and rapidly positioning its mirror to a given one of slightly more than 172 possible different positions and, the vertical scan galvanometer, its mirror to any of its slightly more than one hundred six possible different positions. Where a flat surface is to be marked, it is desirable to limit the angular extent of range of positions of the mirrors to minimize the pin cushion distortion at the fringes of a label when the mirrors are positioned farthest away from their null positions. By way of example, significant dimensions of a working prototype system are:

65 centimeters from scanner unit 32 to the article being marked; a focusing lens 41 having a focal length of 143 centimeters positioned to produce a 1.5 millimeter beam spot diameter on the mirrors; a horizontal scan mirror having dimensions of 0.3 × 0.5 inches; and a vertical scan mirror having dimensions of 0.5 × 0.5 inches.

An average-size label could be produced in 25 seconds. It is contemplated that label production time can be reduced in future systems. The prototype system was successful in marking coated and uncoated fiber board and painted and unpainted wood crates.

While it will be apparent that the preferred embodiment of the invention disclosed is well calculated to fulfill the objects above stated, it will be appreciated that the invention is susceptible to modification, variation, and change without departing from the spirit thereof.

A specific computer program capable of executing the operation of the system as herein disclosed is contained in Special Report DDOU-ME-7201-72 entitled "Cams-Container Automated Marking System, "Defense Supply Agency, Defense Depot Ogden, Ogden, Utah. Correspondence between the computer program disclosed in Special Report DDOU-ME-7201-72 and the flowchart disclosed herein in FIGS. 17A, B, and C is as follows:

| Program Name (Per Report DDOU-ME-7201-72) | Flowchart Steps Covered by the Program (Per FIGS. 17A, B, and C) |
| --- | --- |
| Reade | 300, 302 |
| Burn | Everything not otherwise covered |
| Movem | 306, 308, 310, 314 316, 318, 334, 336, 338, 348, 350, 352, 354, 356, 358, 380, 382, 384, 386, 388, 324, 326 |
| Pulse | 390, 392 |
| Wait | 328 |
| Const | Stores the constants used by the above routines |

What is claimed is:

1. A marking system for marking alphanumeric and symbolic characteristics on an article with a source of coherent electromagnetic energy capable of transmitting sufficient energy to the article to mark the article in response to predetermined information, the improvement comprising generating means for generating pulses of uniform intensity of a fine beam of coherent electromagnetic radiation, storage means for storing said predetermined information as a representation of at least some of the alphanumeric and symbolic characters in the form of a series of separate, discrete $a$ and $b$ co-ordinates in a preselected grid arrangement which can be plotted to define the alphanumeric and symbolic characters by a series of dots, source control means for sequentially altering the path of the source of energy between the source and the article in an $x$ and $y$ grid framework including first altering means for altering the said path in the $x$ direction and second altering means for altering the said path in the $y$ direction, said $x$ and $y$ grid framework forming a matrix of a preselected number of $x$ and $y$ co-ordinates for representing the information to be marked, each set of said preselected number of said $x$ and $y$ co-ordinates defining a general area into which a complete one of said some of the alphanumeric and symbolic characters will be placed, $x$ and $y$ control means including a first $x$ control connected to said first altering means for controlling the position of said first altering means in said $x$ direction and a second $y$ control connected to said second altering means for controlling the position of said second altering means in said $y$ direction and for directing said path to each of said preselected number of said $x$ and $y$ co-ordinates in a preselected sequence, input means for receiving said predetermined information and connected in controlling relation with said control means for controlling said first and second altering means in response to said predetermined information, each of said general areas being of sufficient two dimensional size to include all of the variations of said $a$ and $b$ co-ordinates, $a$ and $b$ control means including a first $a$ co-ordinate control connected to said first altering means for controlling the position of said first altering means in said $a$ co-ordinate direction and $a$ second $b$ co-ordinate control connected to said second altering means for controlling the position of said second altering means in said $b$ co-ordinate direction, and pulse control means connected to the source for pulsing the source when the source is directed at the article by the predetermined $x$, $y$, $a$ and $b$ information for each of said dots for said alphanumeric and symbolic characters to be marked on the article, said source control means includes reflecting means for reflecting coherent electromagnetic radiation from said source onto the article and including a pair of reflecting mirrors, each of which is positionable over a range of positions to reflect the coherent electromagnetic radiation from said source in one of said two dimensions, said first and second control means includes means for generating a first control signal for one of said mirrors and a second control signal for the other of said mirrors, said first and second altering means including a rotary positioning means for each mirror, each rotary positioning means including an under damped scan galvanometer being responsive to the corresponding control signal for positioning its mirror to selected locations about an axis of rotation in accordance with the corresponding control signal, each said scan galvanometer having a known time constant equal to the time required to displace the associated mirror from its initial position to a maximum overshoot position in response to an input of known magnitude, said control signal providing a first pulse having a magnitude selected such that the maximum overshoot position for that first pulse substantially corresponds to a desired one of said selected locations and providing a second pulse applied in accordance with said known time constant at the time said maximum overshoot position is attained and hence when said desired one of said selected locations is attained and with said second pulse having a magnitude corresponding to said desired one of said selected locations whereby oscillation about said desired one of said selected locations is minimized.

2. A marking system as claimed in claim 1 wherein said pulse control means causes said source to emit radiation in pulses, each of which pulses produces one dot on the article.

3. A marking system as claimed in claim 2 wherein said pulse control means causes said source to emit coherent electromagnetic radiation in individual pulses.

4. A marking system as claimed in claim 1 wherein said control means includes means for causing one of said mirrors to position the coherent electromagnetic radiation from said source in a horizontal direction and for causing the other mirror to position the coherent electromagnetic radiation from said source in a vertical direction.

5. A marking system as claimed in claim 4 wherein said system includes means for causing only a pulse of radiation to be emitted by said source only when the mirrors are motionless.

6. A marking system for marking alphanumeric and symbolic characteristics on an article with a source of coherent electromagnetic energy capable of transmitting sufficient energy to the article to mark the article in response to predetermined information, the improvement comprising generating means for generating pulses of uniform intensity of a fine beam of coherent electromagnetic radiation, processor controller means for storing information for a dot matrix representation of the alphanumeric and symbolic characters and responsive to input signals for providing output signals indicative of a dot matrix representation of selected ones of the alphanumeric and symbolic characters, said processor controller means comprising storage means for storing said predetermined information as a representation of at least some of the alphanumeric and symbolic characters in the form of a series of separate, discrete $a$ and $b$ co-ordinates in a preselected grid arrangmenet which can be plotted to define the alphanumeric and symbolic characters by a dot matrix, source control means for sequentially altering the path of the source of energy between the source and the article in an $x$ and $y$ grid framework including first altering means for altering the said path in the $x$ direction and second altering means for altering the said path in the $y$ direction, said $x$ and $y$ grid framework forming a matrix of a preselected number of $x$ and $y$ co-ordinates for representing the information to be marked, each set of said preselected number of said $x$ and $y$ co-ordinates defining a general area into which a complete one of said some of the alphanumeric and symbolic characters will be placed, $x$ and $y$ control means including a first $x$ control connected to said first altering means for controlling the position of said first altering means in said $x$ direction and a second $y$ control connected to said second altering means for controlling the position of said second altering means in said $y$ direction and for directing said path to each of said preselected number of said $x$ and $y$ co-ordinates in a preselected sequence, input means for receiving said predetermined information and connected in controlling relation with said control means for providing said input signals and for controlling said first and second altering means in response to said predetermined information, each of said general areas being of sufficient two dimensional size to include all of the variations of said $a$ and $b$ co-ordinates, $a$ and $b$ control means including a first $a$ co-ordinate control connected to said first altering means for controlling the position of said first altering means in said $a$ co-ordinate direction and $a$ second $b$ co-ordinate control connected to said second altering means for controlling the position of said second altering means in said $b$ co-ordinate direction, and pulse control means connected to the source for pulsing the source when the source is directed at the article by the predetermined $x$, $y$, $a$ and $b$ information for each of said dots for said alphanumeric and symbolic characters to be marked on the article, said source control means comprising horizontal position register means for providing a vertical digital indication of the horizontal position or each dot, vertical position register means for providing a horizontal digital indication of the vertical position for each dot, horizontal analogue means for providing a vertical analogue output having a magnitude varying in accordance with said vertical digital indication, vertical analogue means for providing a horizontal analogue output having a magnitude varying in accordance with said horizontal digital indication, scaling means selectively operable for varying said vertical and horizontal outputs whereby the size of said alphanumeric and symbolic characters can be varied in vertical and horizontal dimension, said source control means includes reflecting means for reflecting coherent electromagnetic radiation from said source onto the article and including a pair of reflecting mirrors, each of which is positionable over a range of positions to reflect the coherent electromagnetic radiation from said source in one of said two dimensions, said first and second control means includes means for generating a first control signal for one of said mirrors and a second control signal for the other of said mirrors, said first and second altering means including a rotary positioning means for each mirror, each rotary positioning means being responsive to the corresponding control signal as varied by said scaling means for positioning its mirror to selected locations about an axis of rotation in accordance with the corresponding control signal.

7. The system of claim 6 with each rotary positioning means including an underdamped scan galvanometer being responsive to the corresponding control signal for positioning its mirror to selected locations about an axis of rotation in accordance with the corresponding control signal, each said scan galvanometer having a known time constant equal to the time required to displace the associated mirror from its initial position to a maximum overshoot position in response to an input of known magnitude, said control signal providing a first pulse havng a magnitude selected such that the maximum overshoot position for that first pulse substantially corresponds to a desired one of said selected locations and providing a second pulse applied in accordance with said known time constant at the time said maximum overshoot position is attained and hence when said desired one of said selected locations is attained and with said second pulse having a magnitude corresponding to said desired one of said selected locations whereby oscillation about said desired one of said selected locations is minimized.

8. A marking system for marking alphanumeric and symbolic characteristics on an article with a source of coherent electromagnetic energy capable of transmitting sufficient energy to the article to mark the article in response to predetermined information, the improvement comprising generating means for generating pulses of uniform intensity of a fine beam of coherent electromagnetic radiation, storage means for storing said predetermined information as a representation of at least some of the alphanumeric and symbolic characters in the form of a series of separate, discrete $a$ and $b$ co-ordinates in a preselected grid arrangement which can be plotted to define the alphanumeric and symbolic characters by a series of dots, source control means for sequentially altering the path of the source of energy between the source and the article in an $x$ and $y$ grid framework including first altering means for altering the said path in the $x$ direction and second altering means for altering the said path in the $y$ direction, said $x$ and $y$ grid framework forming a matrix of a preselected number of $x$ and $y$ co-ordinates for representing the information to be marked, each set of said preselected number of said $x$ and $y$ co-ordinates defining a general area into which a complete one of said some of the alphanumeric and symbolic characters will be placed, $x$ and $y$ control means including a first $x$ control connected to said first altering means for controlling the position of said first altering means in said $x$ direction and a second $y$ control connected to said second altering means for controlling the position of said second altering means in said $y$ direction and for directing said path to each of said preselected number of said $x$ and $y$ co-ordinates in a preselected sequence, input means for receiving said predetermined information and connected in controlling relation with said control means for controlling said first and second altering means in response to said predetermined information, each of said general areas being of sufficient two dimensional size to include all of the variations of said $a$ and $b$ co-ordinates, $a$ and $b$ control means including a first $a$ co-ordinate control connected to said first altering means for controlling the position of said first altering means in said $a$ co-ordinate direction and a second $b$ co-ordinate control connected to said second altering means for controlling the position of said second altering means in said $b$ co-ordinate direction, and pulse control means connected to the source for pulsing the source when the source is directed at the article by the predetermined $x$, $y$, $a$ and $b$ information for each of said dots for said alphanumeric and symbolic characters to be marked on the article, said source control means includes reflecting means for reflecting coherent electromagnetic radiation from said source onto the article and including a pair of reflecting mirrors, each of which is positionable over a range of positions to reflect the coherent electromagnetic radiation from said source in one of said two dimensions, said first and second control means includes means for generating a first control signal for one of said mirrors and a second control signal for the other of said mirrors, said first and second altering means including a rotary positioning means being responsive to the corresponding control signal for positioning its mirror to selected locations about an axis of rotation in accordance with the corresponding control signal, each mirror comprising a highly reflective metallic coating on a silicon substrate bonded to a mirror mount with said reflective coating having a reflectance of around 99.2% at a wave length of 10.6 microns.

9. The marking system of claim 8 wherein said system includes an enclosure containing said mirrors and with said enclosure containing an inert gas enveloping said mirrors.

10. The system of claim 8 with each rotary positioning means including an underdamped scan galvanometer being responsive to the corresponding control signal for positioning its mirror to selected locations about an axis of rotation in accordance with the corresponding control signal, each said scan galvanometer having a known time constant equal to the time required to displace the associated mirror from its initial position to a maximum overshoot position in response to an input of known magnitude, said control signal providing a first pulse having a magnitude selected such that the maximum overshoot position for that first pulse substantially corresponds to a desired one of said selected locations and providing a second pulse applied in accordance with said known time constant at the time said maximum overshoot position is attained and hence when said desired one of said selected locations is attained and with said second pulse having a magnitude corresponding to said desired one of said selected locations whereby oscillation about said desired one of said selected locations is minimized.

* * * * *

UNITED STATES PATENT AND TRADEMARK OFFICE
CERTIFICATE OF CORRECTION

PATENT NO. : 4,024,545
DATED : May 17, 1977
INVENTOR(S) : Terence S. Dowling, et al It is certified that error appears in the above-identified patent and that said Letters Patent are hereby corrected as shown below:

Column 1, line 56, delete "accorddance" and substitute therefor --accordance--.
Column 3, line 49, delete "Date" and substitute therefor --Data--.
Column 3, line 56, delete "magneticc" and substitute therefor --magnetic--
Column 3, line 62, delete "Magneticc" and substitute therefor --Magnetic--
Column 5, line 11, delete "ad" and substitute therefor --and--.
Column 7, line 28, delete "countercloocckwise" and substitute therefor --counterclockwise--.
Column 9, line 12, delete "specificc" and substitute therefor --specific--.
Column 10, line 41, delete "180" and substitute therefor --186--.
Column 11, line 12, delete "($\underline{n}$ = 5, $\underline{i}$ = 7)" third occurrence and substitute therefor --($\underline{h}$ = 5, $\underline{i}$ = 7)--.
Column 11, line 18, delete "($\underline{j}$ = 1, $\underline{k}$ = 1, $\underline{n}$ = 1, $\underline{i}$ = 5)" and substitute therefor --($\underline{j}$ = 1, $\underline{k}$ = 1, $\underline{h}$ = 1, $\underline{i}$ = 5)--.
Column 13, line 40, after "50d" insert --50e--.
Column 14, line 3, delete "nands" and substitute therefor --nand--.
Column 14, line 29, delete "gage" and substitute therefor --gate--.
Column 17, line 5, delete "the" and substitute therefor --this--.
Column 17, line 28, delete "eases" and substitute therefor --ceases--.
Column 17, line 33, after "its" insert --commanded position and then settle with a continuously decreasing--.
Column 18, line 35, delete "subsequentoscillation" and substitute therefor --subsequent oscillation--.
Column 19, line 49, delete "alignement" and substitute therefor --alignment--.
Column 20, line 46, delete "beng" and substitute therefor --being--.
Column 21, line 51, delete "How" and substitute therefor --Now--.
Column 22, line 28, delete "," first occurrence and substitute therefor --.--.

UNITED STATES PATENT AND TRADEMARK OFFICE
CERTIFICATE OF CORRECTION

PATENT NO. : 4,024,545
DATED : May 17, 1977
INVENTOR(S) : Terence S. Dowling, et al It is certified that error appears in the above-identified patent and that said Letters Patent are hereby corrected as shown below:

Page 2 of 2 Continued

Column 22, line 32, delete "for" and substitute therefor --from--.
Column 23, line 1, delete "not" and substitute therefor -- noted --.
Column 23, line 13, delete "172" and substitute therefor --175--.
Column 23, line 44, delete " " " (open quotes) and substitute
        therefor --"-- (close quotes).
Column 25, line 46, delete "arrangemenet" and substitute therefor
        --arrangement--.
Column 26, line 58, delete "havng" and substitute therefor --having--.

Signed and Sealed this

Sixth Day of June 1978

[SEAL]

Attest:

RUTH C. MASON
*Attesting Officer*

DONALD W. BANNER
*Commissioner of Patents and Trademarks*